United States Patent
Su et al.

(10) Patent No.: US 12,412,928 B2
(45) Date of Patent: Sep. 9, 2025

(54) GEL ELECTROLYTE SYSTEM FOR SOLID STATE BATTERY

(71) Applicant: GM GLOBAL TECHNOLOGY OPERATIONS LLC, Detroit, MI (US)

(72) Inventors: Qili Su, Shanghai (CN); Zhe Li, Shanghai (CN); Mengyan Hou, Shanghai (CN); Yong Lu, Shanghai (CN); Haijing Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 633 days.

(21) Appl. No.: 17/710,900

(22) Filed: Mar. 31, 2022

(65) Prior Publication Data
US 2023/0046608 A1   Feb. 16, 2023

(30) Foreign Application Priority Data
Aug. 13, 2021   (CN) .................. 202110929032.X

(51) Int. Cl.
  *H01M 10/0565*   (2010.01)
  *H01M 4/62*      (2006.01)
  *H01M 10/0525*   (2010.01)

(52) U.S. Cl.
  CPC ......... *H01M 10/0565* (2013.01); *H01M 4/62* (2013.01); *H01M 10/0525* (2013.01);
  (Continued)

(58) Field of Classification Search
  None
  See application file for complete search history.

(56) References Cited

U.S. PATENT DOCUMENTS

| 10,714,756 B2 | 7/2020 | Dai et al. |
| 10,826,111 B2 | 11/2020 | Cheng et al. |

(Continued)

FOREIGN PATENT DOCUMENTS

| CN | 105917502 A | 8/2016 |
| CN | 105958116 A | 9/2016 |

(Continued)

OTHER PUBLICATIONS

Bradley R. Frieberg et al.; U.S. Appl. No. 17/171,489, filed Feb. 9, 2021, entitled "Gel Electrolyte for Solid-State Battery", 68 pages.

(Continued)

*Primary Examiner* — Kevin M Bernatz
(74) *Attorney, Agent, or Firm* — Harness, Dickey & Pierce, P.L.C.

(57) ABSTRACT

An electrochemical cell that cycles lithium ions is provided. The electrochemical cell includes a first electrode, a second electrode, and an electrolyte layer disposed between the first electrode and the second electrode. The first electrode includes a first plurality of solid-state electroactive material particles and a first polymeric gel electrolyte, where the first polymeric gel electrolyte includes a first additive. The second electrode includes a second plurality of solid-state electroactive material particles and a second polymeric gel electrolyte that is different from the first polymeric gel electrolyte, where the second polymeric gel electrolyte includes a second additive. The electrolyte layers include a third polymeric gel electrolyte that is different from both the first polymeric gel electrolyte and the second polymeric gel electrolyte.

19 Claims, 8 Drawing Sheets

(52) U.S. Cl.
CPC .............. *H01M 2300/0082* (2013.01); *H01M 2300/0085* (2013.01); *H01M 2300/0091* (2013.01)

(56) References Cited

U.S. PATENT DOCUMENTS

| | | | |
|---|---|---|---|
| 11,121,375 | B2 | 9/2021 | Hou et al. |
| 11,145,922 | B2 | 10/2021 | Li et al. |
| 11,205,798 | B2 | 12/2021 | Li et al. |
| 11,217,826 | B2 | 1/2022 | Li et al. |
| 11,295,901 | B2 | 4/2022 | Hou et al. |
| 11,502,334 | B2 * | 11/2022 | Liao .................. H01M 50/414 |
| 11,569,531 | B2 * | 1/2023 | Mikhaylik ........ H01M 10/0568 |
| 11,581,578 | B2 * | 2/2023 | Oh .................... H01M 10/0525 |
| 11,611,115 | B2 * | 3/2023 | Pham .................. H01M 10/24 |
| 11,631,893 | B2 * | 4/2023 | Rogojina ............. H01M 4/133 429/231.8 |
| 11,710,847 | B2 * | 7/2023 | Laramie .............. H01M 50/426 429/145 |
| 11,735,768 | B2 * | 8/2023 | Frieberg ............... H01M 4/133 429/303 |
| 11,764,428 | B2 * | 9/2023 | Oh ....................... H01M 4/134 429/403 |
| 11,784,297 | B2 * | 10/2023 | Liao .................. H01M 10/0567 429/126 |
| 11,949,065 | B2 * | 4/2024 | Kim .................... H01M 50/431 |
| 2002/0076617 | A1 | 6/2002 | Kezuka et al. |
| 2004/0122178 | A1 | 6/2004 | Huang et al. |
| 2012/0321962 | A1 | 12/2012 | Kajita et al. |
| 2013/0149616 | A1 | 6/2013 | Lee et al. |
| 2015/0280277 | A1 * | 10/2015 | Fleischmann ......... H01M 4/382 429/126 |
| 2016/0268627 | A1 | 9/2016 | Lee et al. |
| 2016/0268633 | A1 | 9/2016 | Schofield et al. |
| 2016/0344008 | A1 * | 11/2016 | Eitouni ............. H01M 10/0525 |
| 2017/0317352 | A1 | 11/2017 | Lee et al. |
| 2018/0076481 | A1 | 3/2018 | Makino et al. |
| 2018/0138513 | A1 | 5/2018 | Dai et al. |
| 2020/0036070 | A1 | 1/2020 | Li et al. |
| 2020/0119357 | A1 | 4/2020 | Hou et al. |
| 2020/0127282 | A1 | 4/2020 | Yersak et al. |
| 2020/0203757 | A1 | 6/2020 | Park et al. |
| 2020/0403267 | A1 | 12/2020 | Li et al. |
| 2021/0020929 | A1 | 1/2021 | Kong et al. |
| 2021/0028481 | A1 | 1/2021 | Hou et al. |
| 2021/0036310 | A1 | 2/2021 | Hou et al. |
| 2021/0036360 | A1 | 2/2021 | Li et al. |
| 2021/0050157 | A1 | 2/2021 | Hou et al. |
| 2021/0050596 | A1 | 2/2021 | Li et al. |
| 2021/0057776 | A1 | 2/2021 | Lu et al. |
| 2021/0066746 | A1 | 3/2021 | Hou et al. |
| 2021/0111426 | A1 | 4/2021 | Li et al. |
| 2021/0111435 | A1 | 4/2021 | Higashi |
| 2021/0135224 | A1 | 5/2021 | Hou et al. |
| 2021/0359309 | A1 * | 11/2021 | Iwamoto ........... H01M 10/0585 |
| 2021/0367224 | A1 | 11/2021 | Gaben |
| 2022/0102756 | A1 | 3/2022 | Frieberg et al. |
| 2022/0123352 | A1 | 4/2022 | Li et al. |
| 2022/0140422 | A1 | 5/2022 | Chen et al. |
| 2022/0166031 | A1 | 5/2022 | Li et al. |
| 2022/0181598 | A1 | 6/2022 | Lu et al. |
| 2022/0181685 | A1 | 6/2022 | Li et al. |
| 2022/0255130 | A1 | 8/2022 | Frieberg |
| 2022/0263055 | A1 | 8/2022 | Hou et al. |
| 2022/0263129 | A1 | 8/2022 | Lu et al. |
| 2022/0302526 | A1 | 9/2022 | Li et al. |
| 2022/0407079 | A1 | 12/2022 | Lu et al. |
| 2023/0015143 | A1 | 1/2023 | Su et al. |
| 2023/0021366 | A1 | 1/2023 | Van Workum et al. |
| 2023/0024667 | A1 | 1/2023 | Li et al. |
| 2023/0025830 | A1 | 1/2023 | Su et al. |
| 2023/0046608 | A1 | 2/2023 | Su et al. |
| 2023/0063684 | A1 | 3/2023 | Li et al. |
| 2023/0072660 | A1 | 3/2023 | Su et al. |
| 2023/0074112 | A1 | 3/2023 | Su et al. |
| 2023/0128413 | A1 | 4/2023 | Frieberg et al. |
| 2023/0155213 | A1 | 5/2023 | Liu et al. |
| 2023/0246172 | A1 | 8/2023 | Li et al. |
| 2023/0246310 | A1 | 8/2023 | Lu et al. |
| 2023/0268551 | A1 | 8/2023 | Li et al. |

FOREIGN PATENT DOCUMENTS

| | | | |
|---|---|---|---|
| CN | 107615551 | A | 1/2018 |
| CN | 108039511 | A | 5/2018 |
| CN | 110400932 | A | 11/2019 |
| CN | 114914531 | A | 8/2022 |
| CN | 115939504 | A | 4/2023 |
| DE | 102016015191 | B3 | 6/2018 |
| DE | 102018203466 | A1 | 9/2019 |
| DE | 102019115643 | A1 | 4/2020 |
| DE | 102021130557 | A1 | 8/2022 |
| DE | 102022105204 | A1 | 2/2023 |
| KR | 20080107291 | A | 12/2008 |
| WO | 2020195032 | A1 | 10/2020 |
| WO | WO-2021145690 | A1 * | 7/2021 ............ H01M 10/05 |

OTHER PUBLICATIONS

Yong Lu et al.; U.S. Appl. No. 17/543,160, filed Dec. 6, 2021, entitled "Solid State Battery with Uniformly Distributed Electrolyte, and Methods of Fabrication Relating Thereto"; 64 pages.

Mengyan Hou et al.; U.S. Appl. No. 17/550,507, filed Dec. 14, 2021, entitled "Bipolar Solid-State Battery with Enhanced Interfacial Contact"; 61 pages.

Bradley R. Frieberg et al.; U.S. Appl. No. 17/551,753, filed Dec. 15, 2021, entitled "Solid Electrolyte Coating of Lithium-Doped Silicon Oxide Particles as Anode Active Material"; 39 pages.

Qili Su et al.; U.S. Appl. No. 17/560,673, filed Dec. 23, 2021, entitled "Folded Bipolar Battery Design"; 45 pages.

Yong Lu et al.; U.S. Appl. No. 17/696,567, filed Mar. 16, 2022, entitled "Designs of High-Power Gel-Assisted Bipolar Solid-State Battery"; 64 pages.

Zhe Li et al.; U.S. Appl. No. 17/738,767, filed May 6, 2022, entitled "Gel Polymer Electrolyte for Electrochemical Cell"; 38 pages.

Zhe Li et al.; U.S. Appl. No. 17/746,575, filed May 17, 2022, entitled "Lithiation Additive for Solid-State Battery Including Gel Electrolyte", 71 pages.

Jingyuan Liu et al.; U.S. Appl. No. 17/542,974, filed Dec. 6, 2021, entitled "Bipolar Capacitor Assisted Battery"; 31 pages.

Zhe Li et al.; U.S. Appl. No. 17/542,299, filed Dec. 3, 2021, entitled "In-Situ Gelation Method to Make a Bipolar Solid-State Battery"; 60 pages.

Yong Lu et al.; U.S. Appl. No. 17/556,175, filed Dec. 20, 2021, entitled "Non-Flammable Solvate Ionic Liquid Electrolyte With Diluters"; 59 pages.

Zhe Li et al.; U.S. Appl. No. 17/683,976, filed Mar. 1, 2022, entitled "Self-Heating Bipolar Solid-State Battery"; 72 pages.

Qili Su et al.; U.S. Appl. No. 17/688,445, filed Mar. 7, 2022, entitled "Methods of Fabricating Bipolar Solid State Batteries"; 77 pages.

Qili Su et al.; U.S. Appl. No. 17/697,135, filed Mar. 17, 2022, entitled "Methods of Manufacturing Bipolar Solid-State Batteries"; 77 pages.

Qi Lu et al.; U.S. Appl. No. 17/698,865, filed Mar. 18, 2022, entitled "Bipolar Current Collector and Method of Making the Same", 48 pages.

Zhe Li et al.; U.S. Appl. No. 17/707,524, filed Mar. 29, 2022, entitled "Argyrodite Solid Electrolytes for Solid-State Batteries and Methods of Making the Same", 56 pages.

Zhe Li et al.; U.S. Appl. No. 17/458,903, filed Aug. 27, 2021, entitled "Anode-Free Solid-State Battery and Method of Battery Fabrication", 28 pages.

Qili Su et al.; U.S. Appl. No. 17/710,213, filed Mar. 31, 2022, entitled "Polymeric Gel Electrolyte Systems for High-Power Solid-State Battery"; 62 pages.

First Office Action for German Patent Application No. 10 2022 111 248.9 issued on Nov. 29, 2022, with correspondence from Manitz Finsterwald Patent- und Rechtsanwaltspartnerschaft mbB summarizing Office Action; 7 pages.

(56) References Cited

OTHER PUBLICATIONS

First Office Action for German Patent Application No. 10 2022 105 204.4 issued on Aug. 26, 2024, with correspondence from Manitz Finsterwald Patent—und Rechtsanwaltspartnerschaft mbB summarizing Office Action; 5 pages.

First Office Action for Chinese Patent Application No. 202110929032.X issued Apr. 17, 2025, with correspondence from China Patent Agent (H.K.) Ltd summarizing Office Action.

* cited by examiner

GEL ELECTROLYTE SYSTEM FOR SOLID STATE BATTERY

CROSS-REFERENCE TO RELATED APPLICATIONS

This application claims the benefit and priority of Chinese Patent Application No. 202110929032.X filed Aug. 13, 2021. The entire disclosure of the above application is incorporated herein by reference.

INTRODUCTION

This section provides background information related to the present disclosure which is not necessarily prior art.

Electrochemical energy storage devices, such as lithium-ion batteries, can be used in a variety of products, including automotive products such as start-stop systems (e.g., 12V start-stop systems), battery-assisted systems ("µBAS"), Hybrid Electric Vehicles ("HEVs"), and Electric Vehicles ("EVs"). Typical lithium-ion batteries include two electrodes and an electrolyte component and/or separator. One of the two electrodes can serve as a positive electrode or cathode, and the other electrode can serve as a negative electrode or anode. Lithium-ion batteries may also include various terminal and packaging materials. Rechargeable lithium-ion batteries operate by reversibly passing lithium ions back and forth between the negative electrode and the positive electrode. For example, lithium ions may move from the positive electrode to the negative electrode during charging of the battery and in the opposite direction when discharging the battery. A separator and/or electrolyte may be disposed between the negative and positive electrodes. The electrolyte is suitable for conducting lithium ions between the electrodes and, like the two electrodes, may be in a solid form, a liquid form, or a solid-liquid hybrid form. In the instances of solid-state batteries, which include a solid-state electrolyte layer disposed between the solid-state electrodes, the solid-state electrolyte physically separates the solid-state electrodes so that a distinct separator is not required.

Solid-state batteries have advantages over batteries that include a separator and a liquid electrolyte. These advantages can include a longer shelf life with lower self-discharge, simpler thermal management, a reduced need for packaging, and the ability to operate within a wider temperature window. For example, solid-state electrolytes are generally non-volatile and non-flammable, so as to allow cells to be cycled under harsher conditions without experiencing diminished potential or thermal runaway, which can potentially occur with the use of liquid electrolytes. However, solid-state batteries often experience comparatively low power capabilities. Low power capabilities may be a result of interfacial resistance within the solid-state electrodes and/or at the electrode, and solid-state electrolyte layer interfacial resistance caused by limited contact, or void spaces, between the solid-state active particles and/or the solid-state electrolyte particles. Accordingly, it would be desirable to develop high-performance solid-state battery designs, materials, and methods that improve power capabilities, as well as energy density.

SUMMARY

This section provides a general summary of the disclosure, and is not a comprehensive disclosure of its full scope or all of its features.

The present disclosure relates to solid-state batteries, for example to bipolar solid-state batteries, including a polymeric gel electrolyte system and exhibiting enhanced interfacial contact, and to methods for forming the same.

In various aspects, the present disclosure provides an electrochemical cell that cycles lithium ions. The electrochemical cell may include a first electrode, a second electrode, and an electrolyte layer disposed between the first electrode and the second electrode. The first electrode may include a first plurality of solid-state electroactive material particles and a first polymeric gel electrolyte. The second electrode may include a second plurality of solid-state electroactive material particles and a second polymeric gel electrolyte that is different from the first polymeric gel electrolyte. The electrolyte layer may include a third polymeric gel electrolyte that is different from both the first polymeric gel electrolyte and the second polymeric gel electrolyte.

In one aspect, the first polymeric gel electrolyte may include greater than 0 wt. % to less than or equal to about 10 wt. % of a first additive; and the second polymeric gel electrolyte may include greater than 0 wt. % to less than or equal to about 10 wt. % of a second additive.

In one aspect, the first additive may include a compound having an unsaturated carbon bond, a sulfur-containing compound, a halogen-containing compound, a methyl substituted glycolide derivative, a maleimide (MI), a compound containing an electron withdrawing group, and combinations thereof.

In one aspect, the unsaturated carbon bond containing compound may include vinylene carbonate (VC), vinyl ethylene carbonate (VEC), and combinations thereof.

In one aspect, the sulfur-containing compound may include ethylene sulfite (ES), propylene sulfite (PyS), and combinations thereof.

In one aspect, the halogen-containing compound may include fluoroethylene carbonate (FEC), chloro-ethylene carbonate (Cl-EC), and combinations thereof.

In one aspect, the second additive may include a boron-containing compound, a silicon-containing compound, a phosphorus-containing compound, a compound containing at least one of a phenyl group, a thiophene aniline group, a maleimide group, an aniline group, an anisole group, an adamantyl group, a furan group, and a thiophene group, and combinations thereof.

In one aspect, the boron-containing compound may include lithium bis(oxalato)borate (LiBOB), lithium difluoro(oxalato)borate (LiDFOB), tris(trimethylsilyl)borate (TMSB), and combinations thereof.

In one aspect, the silicon-containing compound may include tris(trimethylsilyl)phosphate (TMSP), tris(trimethylsilyl)borate (TMSB), and combinations thereof.

In one aspect, the phosphorus-containing compound may include triphenyl phosphine (TPP), ethyl diphenylphosphinite (EDP), triethyl phosphite (TEP), and combinations thereof.

In one aspect, the compound containing at least one of a phenyl group, a thiophene aniline group, a maleimide group, an aniline group, an anisole group, an adamantyl group, a furan group, and a thiophene group may include biphenyl (BP), o-terphenyl (OT), 2,2'-bis[4-(4 maleimidophenoxy)phenyl]propane (BMP), N,N-dimethyl-aniline (DMA), and combinations thereof.

In one aspect, the first polymeric gel electrolyte and the second polymeric gel electrolyte may each further include greater than or equal to about 0.1 wt. % to less than or equal to about 50 wt. % of a polymer host.

In one aspect, the first polymeric gel electrolyte and the second polymeric gel electrolyte may each include a polymer host independently selected from the group consisting of: poly(ethylene oxide) (PEO), poly(vinylidene fluoride-co-hexafluoropropylene) (PVdF-HFP), poly(methyl methacrylate) (PMMA), carboxymethyl cellulose (CMC), polyacrylonitrile (PAN), polyvinylidene difluoride (PVDF), poly(vinyl alcohol) (PVA), polyvinylpyrrolidone (PVP), lithium polyacrylate (LiPAA), and combinations thereof.

In one aspect, the first polymeric gel electrolyte and the second polymeric gel electrolyte may each further include greater than or equal to about 5 wt. % to less than or equal to about 90 wt. % of a liquid electrolyte.

In one aspect, the third polymeric gel electrolyte may include greater than or equal to about 0.1 wt. % to less than or equal to about 50 wt. % of a polymer host, and greater than or equal to about 5 wt. % to less than or equal to about 90 wt. % of a liquid electrolyte.

In one aspect, the polymer host may be selected from the group consisting of: poly(acrylonitrile) (PAN), poly(ethylene oxide) (PEO), poly(ethylene glycol) (PEG), polyethylene carbonate (PEC), poly(trimethylene carbonate) (PTMC), poly(propylene carbonate) (PPC), polyvinylidene difluoride (PVDF), poly(vinylidene fluoride-co-hexafluoropropylene) (PVDF-HFP), and combinations thereof.

In one aspect, the electrolyte layer may be a free-standing membrane defined by the third polymeric gel electrolyte. The free-standing membrane may have a thickness greater than or equal to about 5 μm to less than or equal to about 1,000 μm.

In one aspect, the electrolyte layer may further include greater than 0 wt. % to less than or equal to about 80 wt. % of a plurality of solid-state electrolyte particles.

In one aspect, the electrochemical cell further may further include a first bipolar current collector disposed on or adjacent to an exposed surface of the first electrode and parallel with the electrolyte layer; a second bipolar current collector disposed on or adjacent to an exposed surface of the second electrode and parallel with the electrolyte layer; and one or more polymer blockers coupled to and extending between the first bipolar current collector and the second bipolar current collector.

In various aspects, the present disclosure provides an electrochemical cell that cycles lithium ions. The electrochemical cell may include a first electrode, a second electrode, and an electrolyte layer disposed between the first electrode and the second electrode. The first electrode may include a first plurality of solid-state electroactive material particles and a first polymeric gel electrolyte. The first polymeric gel electrolyte may include greater than 0 wt. % to less than or equal to about 10 wt. % of a first additive, greater than or equal to about 0.1 wt. % to less than or equal to about 15 wt. % of a first polymer host, and greater than or equal to about 5 wt. % to less than or equal to about 90 wt. % of a first liquid electrolyte. The second electrode may include a second plurality of solid-state electroactive material particles and a second polymeric gel electrolyte. The second polymeric gel electrolyte may include greater than 0 wt. % to less than or equal to about 10 wt. % of a second additive, greater than or equal to about 0.1 wt. % to less than or equal to about 15 wt. % of a second polymer host, and greater than or equal to about 5 wt. % to less than or equal to about 90 wt. % of a second liquid electrolyte. The electrolyte layer may include a third polymeric gel electrolyte. The third polymeric gel electrolyte may include greater than or equal to about 10 wt. % to less than or equal to about 50 wt. % of a third polymer host and greater than or equal to about 5 wt. % to less than or equal to about 90 wt. % of a third liquid electrolyte.

In one aspect, the first liquid electrolyte, the second liquid electrolyte, and the third liquid electrolyte are the same or different.

In one aspect, the first polymer host and the second polymer host may be independently selected from the group consisting of: poly(ethylene oxide) (PEO), poly(vinylidene fluoride-co-hexafluoropropylene) (PVdF-HFP), poly(methyl methacrylate) (PMMA), carboxymethyl cellulose (CMC), polyacrylonitrile (PAN), polyvinylidene difluoride (PVDF), poly(vinyl alcohol) (PVA), polyvinylpyrrolidone (PVP), lithium polyacrylate (LiPAA), and combinations thereof.

In one aspect, the third polymer host may be selected from the group consisting of: poly(acrylonitrile) (PAN), poly(ethylene oxide) (PEO), poly(ethylene glycol) (PEG), polyethylene carbonate (PEC), poly(trimethylene carbonate) (PTMC), poly(propylene carbonate) (PPC), polyvinylidene difluoride (PVDF), poly(vinylidene fluoride-co-hexafluoropropylene) (PVDF-HFP), and combinations thereof.

In one aspect, the first additive may be selected from the group consisting of: vinylene carbonate (VC), vinyl ethylene carbonate (VEC), ethylene sulfite (ES), propylene sulfite (PyS), fluoroethylene carbonate (FEC), chloro-ethylene carbonate (Cl-EC), and combinations thereof.

In one aspect, the second additive may be selected from the group consisting of: bis(oxalato)borate (LiBOB), lithium difluoro(oxalato)borate (LiDFOB), tris(trimethylsilyl)borate (TMSB), tris(trimethylsilyl)phosphate (TMSP), triphenyl phosphine (TPP), ethyl diphenylphosphinite (EDP), triethyl phosphite (TEP), biphenyl (BP), o-terphenyl (OT), 2,2'-bis[4-(4 maleimidophenoxy)phenyl]propane (BMP), N,N-dimethyl-aniline (DMA), and combinations thereof.

In various aspects, the present disclosure provides a method for forming an electrochemical cell that cycles lithium ions. The method may include preparing a first gel-assisted electrode, preparing a second gel-assisted electrode, and preparing an electrolyte layer comprising a third precursor liquid. Preparing the first gel-assisted electrode may include contacting a first precursor electrode and a first precursor liquid that includes a first solvent and a first additive, and removing the first solvent to form the first gel-assisted electrode. Preparing the second gel-assisted electrode may include contacting a second precursor electrode and a second precursor liquid that includes a second solvent and a second additive, and removing the second solvent to form the second gel-assisted electrode. The first precursor liquid may be different from the second and third precursor liquids. The second precursor liquid may be different from the first and third precursor liquids. The method may further include stacking the first gel-assisted electrode, the second gel-assisted electrode, and the electrolyte layer to form the electrochemical cell, where the electrolyte layer is disposed between the first gel-assisted electrode and the second gel-assisted electrode.

In one aspect, the first additive may be selected from the group consisting of: vinylene carbonate (VC), vinyl ethylene carbonate (VEC), ethylene sulfite (ES), propylene sulfite (PyS), fluoroethylene carbonate (FEC), chloro-ethylene carbonate (Cl-EC), and combinations thereof.

In one aspect, the second additive may be selected from the group consisting of: bis(oxalato)borate (LiBOB), lithium difluoro(oxalato)borate (LiDFOB), tris(trimethylsilyl)borate (TMSB), tris(trimethylsilyl)phosphate (TMSP), triphenyl phosphine (TPP), ethyl diphenylphosphinite (EDP), triethyl phosphite (TEP), biphenyl (BP), o-terphenyl (OT), 2,2'-bis[4-(4 maleimidophenoxy)phenyl]propane (BMP), N,N-dimethyl-aniline (DMA), and combinations thereof.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1A:
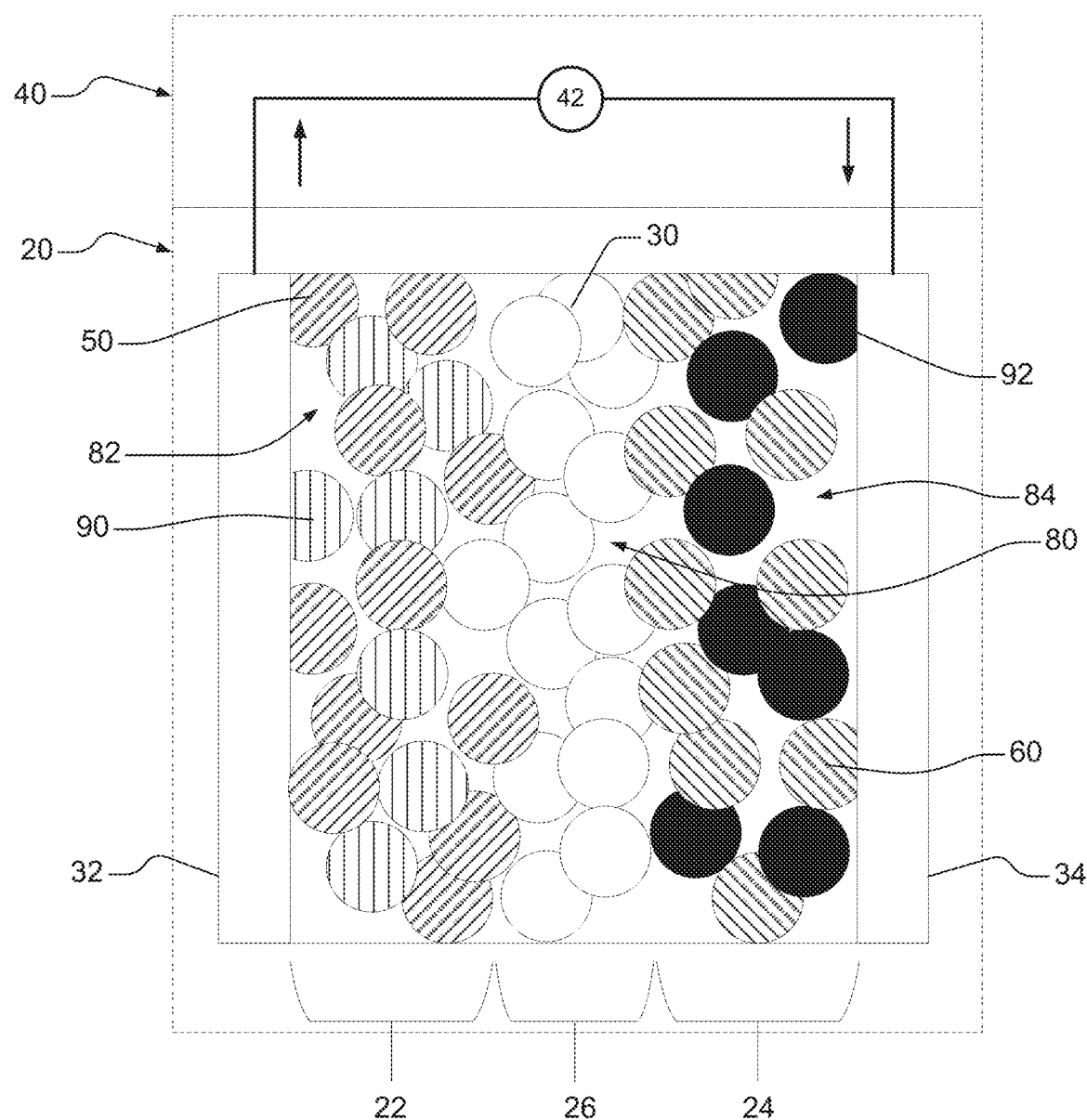
FIG. 1A is an illustration of an example solid-state battery in accordance with various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The current technology pertains to solid-state batteries (SSBs), for example only, bipolar solid-state batteries, and methods of forming and using the same. Solid-state batteries may include at least one solid component, for example, at least one solid electrode, but may also include semi-solid or gel, liquid, or gas components, in certain variations. Solid-state batteries may have a bipolar stack design comprising a plurality of bipolar electrodes where a first mixture of solid-state electroactive material particles (and optional solid-state electrolyte particles) is disposed on a first side of a current collector, and a second mixture of solid-state electroactive material particles (and optional solid-state electrolyte particles) is disposed on a second side of a current collector that is parallel with the first side. The first mixture may include, as the solid-state electroactive material particles, positive electrode or cathode material particles. The second mixture may include, as solid-state electroactive material particles, negative electrode or anode material particles. The solid-state electrolyte particles in each instance may be the same or different.

Such solid-state batteries may be incorporated into energy storage devices, like rechargeable lithium-ion batteries, which may be used in automotive transportation applications (e.g., motorcycles, boats, tractors, buses, mobile homes, campers, and tanks). The present technology, however, may also be used in other electrochemical devices, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. In various aspects, the present disclosure provides a rechargeable lithium-ion battery that exhibits high temperature tolerance, as well as improved safety and superior power capability and life performance.

Figure 1B:
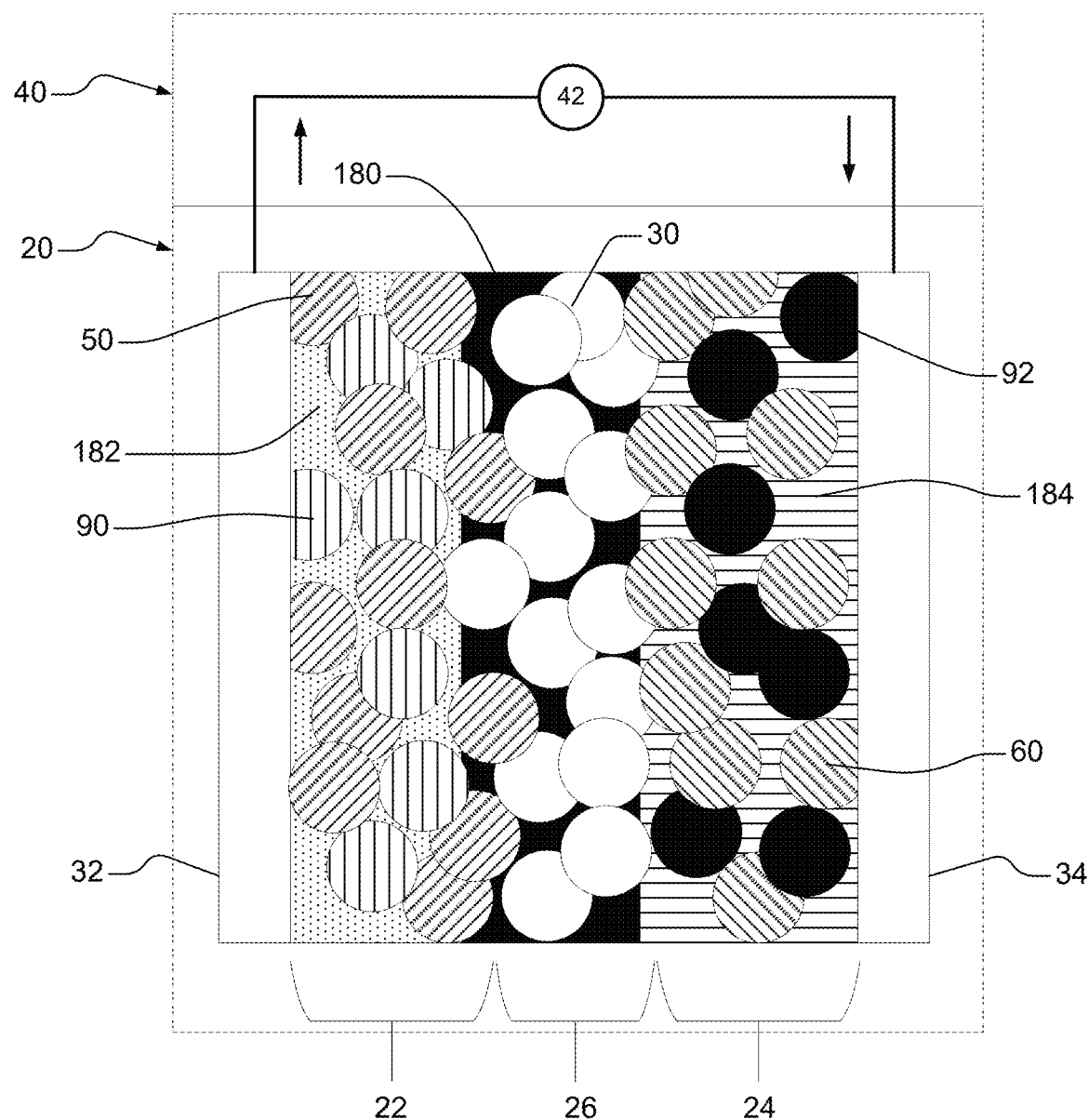
FIG. 1B is an example solid-state battery having a polymeric gel electrolyte system in accordance with various aspects of the present disclosure.

An exemplary and schematic illustration of a solid-state electrochemical cell unit (also referred to as a "solid-state battery" and/or "battery") 20 that cycles lithium ions is shown in FIGS. 1A and 1B. The battery 20 includes a negative electrode (i.e., anode) 22, a positive electrode (i.e., cathode) 24, and an electrolyte layer 26 that occupies a space defined between the two or more electrodes. The electrolyte layer 26 is a solid-state or semi-solid state separating layer that physically separates the negative electrode 22 from the positive electrode 24. The electrolyte layer 26 may include a first plurality of solid-state electrolyte particles 30. A second plurality of solid-state electrolyte particles 90 may be mixed with negative solid-state electroactive particles 50 in the negative electrode 22, and a third plurality of solid-state electrolyte particles 92 may be mixed with positive solid-state electroactive particles 60 in the positive electrode 24, so as to form a continuous electrolyte network, which may be a continuous lithium-ion conduction network.

A first bipolar current collector 32 may be positioned at or near the negative electrode 22. A second bipolar current collector 34 may be positioned at or near the positive electrode 24. The first and second bipolar current collectors 32, 34 may be the same or different. For example, the first and second bipolar current collectors 32, 34 may each have a thickness greater than or equal to about 2 µm to less than or equal to about 30 µm. The first and second bipolar current collectors 32, 34 may each be metal foils including at least one of stainless steel, aluminum, nickel, iron, titanium, copper, tin, alloys thereof, or any other electrically conductive material known to those of skill in the art.

In certain variations, the first bipolar current collector 34 and/or the second bipolar current collector 34 may be a cladded foil, for example, where one side (e.g., the first side or the second side) of the current collector 32, 34 includes one metal (e.g., first metal) and another side (e.g., the other side of the first side or the second side) of the current collector 232 includes another metal (e.g., second metal). The cladded foil may include, for example only, aluminum-copper (Al—Cu), nickel-copper (Ni—Cu), stainless steel-copper (SS—Cu), aluminum-nickel (Al—Ni), aluminum-stainless steel (Al—SS), and nickel-stainless steel (Ni—SS). In certain variations, the first bipolar current collector 232A and/or second bipolar current collectors 232B may be pre-coated, such as graphene or carbon-coated aluminum current collectors.

In each instance, the first bipolar current collector 32 and the second bipolar current collector 34 respectively collect and move free electrons to and from an external circuit 40 (as shown by the block arrows). For example, an interruptible external circuit 40 and a load device 42 may connect the negative electrode 22 (through the first bipolar current collector 32) and the positive electrode 24 (through the second bipolar current collector 34).

The battery 20 can generate an electric current (indicated by arrows in FIGS. 1A and 1B) during discharge by way of reversible electrochemical reactions that occur when the external circuit 40 is closed (to connect the negative electrode 22 and the positive electrode 24) and when the negative electrode 22 has a lower potential than the positive electrode 24. The chemical potential difference between the negative electrode 22 and the positive electrode 24 drives electrons produced by a reaction, for example, the oxidation of intercalated lithium, at the negative electrode 22, through the external circuit 40 toward the positive electrode 24. Lithium ions, which are also produced at the negative electrode 22, are concurrently transferred through the electrolyte layer 26 toward the positive electrode 24. The electrons flow through the external circuit 40 and the lithium ions migrate across the electrolyte layer 26 to the positive electrode 24, where they may be plated, reacted, or intercalated. The electric current passing through the external circuit 40 can be harnessed and directed through the load device 42 (in the direction of the arrows) until the lithium in the negative electrode 22 is depleted and the capacity of the battery 20 is diminished.

The battery 20 can be charged or reenergized at any time by connecting an external power source (e.g., charging device) to the battery 20 to reverse the electrochemical reactions that occur during battery discharge. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator. The connection of the external power source to the battery 20 promotes a reaction, for example, non-spontaneous oxidation of intercalated lithium, at the positive electrode 24 so that electrons and lithium ions are produced. The electrons, which flow back toward the negative electrode 22 through the external circuit 40, and the lithium ions, which move across the electrolyte layer 26 back toward the negative electrode 22, reunite at the negative electrode 22 and replenish it with lithium for consumption during the next battery discharge cycle. As such, a complete discharging event followed by a complete charging event is considered to be a cycle, where lithium ions are cycled between the positive electrode 24 and the negative electrode 22.

Although the illustrated example includes a single positive electrode 24 and a single negative electrode 22, the skilled artisan will recognize that the current teachings apply to various other configurations, including those having one or more cathodes and one or more anodes, as well as various current collectors and current collector films with electroactive particle layers disposed on or adjacent to or embedded within one or more surfaces thereof. Likewise, it should be recognized that the battery 20 may include a variety of other components that, while not depicted here, are nonetheless known to those of skill in the art. For example, the battery 20 may include a casing, a gasket, terminal caps, and any other conventional components or materials that may be situated within the battery 20, including between or around the negative electrode 22, the positive electrode 24, and/or the solid-state electrolyte 26 layer.

In many configurations, each of the negative electrode current collector 32, the negative electrode 22, the electrolyte layer 26, the positive electrode 24, and the positive electrode current collector 34 are prepared as relatively thin layers (for example, from several microns to a millimeter or less in thickness) and assembled in layers connected in series arrangement to provide a suitable electrical energy, battery voltage and power package, for example, to yield a Series-Connected Elementary Cell Core ("SECC"). In various other instances, the battery 20 may further include electrodes 22, 24 connected in parallel to provide suitable electrical energy, battery voltage, and power for example, to yield a Parallel-Connected Elementary Cell Core ("PECC").

The size and shape of the battery 20 may vary depending on the particular applications for which it is designed. Battery-powered vehicles and hand-held consumer electronic devices are two examples where the battery 20 would most likely be designed to different size, capacity, voltage, energy, and power-output specifications. The battery 20 may also be connected in series or parallel with other similar lithium-ion cells or batteries to produce a greater voltage output, energy, and power if it is required by the load device 42. The battery 20 can generate an electric current to the load device 42 that can be operatively connected to the external circuit 40. The load device 42 may be fully or partially powered by the electric current passing through the external circuit 40 when the battery 20 is discharging. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be an electricity-generating apparatus that charges the battery 20 for purposes of storing electrical energy.

With renewed reference to FIGS. 1A and 1B, the solid-state electrolyte layer 26 provides electrical separation—preventing physical contact—between the negative electrode 22 and the positive electrode 24. The solid-state electrolyte layer 26 also provides a minimal resistance path for internal passage of ions. In various aspects, the solid-state electrolyte layer 26 may be defined by a first plurality of solid-state electrolyte particles 30. For example, the solid-state electrolyte layer 26 may be in the form of a layer or a composite that comprises the first plurality of solid-state electrolyte particles 30. The solid-state electrolyte particles 30 may have an average particle diameter greater than or equal to about 0.02 µm to less than or equal to about 20 µm, optionally greater than or equal to about 0.1 µm to less than or equal to about 10 µm, and in certain aspects, optionally greater than or equal to about 0.1 µm to less than or equal to about 1 µm. The solid-state electrolyte layer 26 may be in the form of a layer having a thickness greater than or equal to about 5 µm to less than or equal to about 200 µm, optionally greater than or equal to about 10 µm to less than or equal to about 100 µm, optionally about 40 µm, and in certain aspects, optionally about 30 µm. The solid-state electrolyte layer 26 may have an interparticle porosity 80 between the solid-state electrolyte particles 30 that is greater than 0 vol. % to less than or equal to about 50 vol. %, optionally greater than or equal to about 1 vol. % to less than or equal to about 40 vol. %, and in certain aspects, optionally greater than or equal to about 2 vol. % to less than or equal to about 20 vol. %.

The solid-state electrolyte particles 30 may comprise one or more sulfide-based particles, oxide-based particles, metal-doped or aliovalent-substituted oxide particles, inactive oxide particles, nitride-based particles, hydride-based particles, halide-based particles, and borate-based particles.

In certain variations, the oxide-based particles may comprise one or more garnet ceramics, LISICON-type oxides, NASICON-type oxides, and Perovskite type ceramics. For example, the garnet ceramics may be selected from the group consisting of: $Li_7La_3Zr_2O_{12}$, $Li_{6.2}Ga_{0.3}La_{2.95}Rb_{0.05}Zr_2O_{12}$, $Li_{6.85}La_{2.9}Ca_{0.1}Zr_{1.75}Nb_{0.25}O_{12}$, $Li_{6.25}Al_{0.25}La_3Zr_2O_{12}$, $Li_{6.75}La_3Zr_{1.75}Nb_{0.25}O_{12}$, and combinations thereof. The LISICON-type oxides may be selected from the group consisting of: $Li_{2+2x}Zn_{1-x}GeO_4$ (where 0<x<1), $Li_{14}Zn(GeO_4)_4$, $Li_{3+x}(P_{1-x}Si_x)O_4$ (where 0<x<1), $Li_{3+x}Ge_xV_{1-x}O_4$ (where 0<x<1), and combinations thereof. The NASICON-type oxides may be defined by $LiMM'(PO_4)_3$, where M and M' are independently selected from Al, Ge, Ti, Sn, Hf, Zr, and La. For example, in certain variations, the NASICON-type oxides may be selected from the group consisting of: $Li_{1+x}Al_xGe_{2-x}(PO_4)_3$ (LAGP) (where 0<x<2), $Li_{1.4}Al_{0.4}Ti_{1.6}(PO_4)_3$, $Li_{1.3}Al_{0.3}Ti_{1.7}(PO_4)_3$, $LiTi_2(PO_4)_3$, $LiGeTi(PO_4)_3$, $LiGe_2(PO_4)_3$, $LiHf_2(PO_4)_3$, and combinations thereof. The Perovskite-type ceramics may be selected from the group consisting of: $Li_{3.3}La_{0.53}TiO_3$, $LiSr_{1.65}Zr_{1.3}Ta_{1.7}O_9$, $Li_{2x-y}Sr_{1-x}Ta_yZr_{1-y}O_3$ (where $x=0.75y$ and $0.60<y<0.75$), $Li_{3/8}Sr_{7/16}Nb_{3/4}Zr_{1/4}O_3$, $Li_{3x}La_{(2/3-8)}TiO_3$ (where $0<x<0.25$), and combinations thereof.

In certain variations, the metal-doped or aliovalent-substituted oxide particles may include, for example only, aluminum (Al) or niobium (Nb) doped $Li_7La_3Zr_2O_{12}$, antimony (Sb) doped $Li_7La_3Zr_2O_{12}$, gallium (Ga) doped $Li_7La_3Zr_2O_{12}$, chromium (Cr) and/or vanadium (V) substituted $LiSn_2P_3O_{12}$, aluminum (Al) substituted $Li_{1+y}Al_xTi_{2-x}Si_yP_{3-y}O_{12}$ (where $0<x<2$ and $0<y<3$), and combinations thereof.

In certain variations, the sulfide-based particles may include, for example only, a pseudobinary sulfide, a pseudoternary sulfide, and/or a pseudoquaternary sulfide. Example pseudobinary sulfide systems include $Li_2S$—$P_2S_5$ systems (such as, $Li_3PS_4$, $Li_7P_3S_{11}$, and $Li_{9.6}P_3S_{12}$), $Li_2S$—$SnS_2$ systems (such as, $Li_4SnS_4$), $Li_2S$—$SiS_2$ systems, $Li_2S$—$GeS_2$ systems, $Li_2S$—$B_2S_3$ systems, $Li_2S$—$Ga_2S_3$ system, $Li_2S$—$P_2S_3$ systems, and $Li_2S$—$Al_2S_3$ systems. Example pseudoternary sulfide systems include $Li_2O$—$Li_2S$—$P_2S_5$ systems, $Li_2S$—$P_2S_5$—$P_2O_5$ systems, $Li_2S$—$P_2S_5$—$GeS_2$ systems (such as, $Li_{3.25}Ge_{0.25}P_{0.75}S_4$ and $Li_{10}GeP_2S_{12}$), $Li_2S$—$P_2S_5$—$LiX$ systems (where X is one of F, Cl, Br, and I) (such as, $Li_6PS_5Br$, $Li_6PS_5Cl$, $Li_7P_2S_8I$, and $Li_4PS_4I$), $Li_2S$—$As_2S_5$—$SnS_2$ systems (such as, $Li_{3.833}Sn_{0.833}As_{0.166}S_4$), $Li_2S$—$P_2S_5$—$Al_2S_3$ systems, $Li_2S$—$LiX$—$SiS_2$ systems (where X is one of F, Cl, Br, and I), $0.4LiI \cdot 0.6Li_4SnS_4$, and $Li_{11}Si_2PS_{12}$. Example pseudoquaternary sulfide systems include $Li_2O$—$Li_2S$—$P_2S_5$—$P_2O_5$ systems, $Li_{9.54}Si_{1.74}P_{1.44}S_{11.7}Cl_{0.3}$, $Li_7P_{2.9}Mn_{0.1}S_{10.7}I_{0.3}$, and $Li_{10.35}[Sn_{0.27}Si_{1.08}]P_{1.65}S_{12}$.

In certain variations, the inactive oxide particles may include, for example only, $SiO_2$, $Al_2O_3$, $TiO_2$, $ZrO_2$, and combinations thereof the nitride-based particles may include, for example only, $Li_3N$, $Li_7PN_4$, $LiSi_2N_3$, and combinations thereof; the hydride-based particles may include, for example only, $LiBH_4$, $LiBH_4$—$LiX$ (where x=Cl, Br, or I), $LiNH_2$, $Li_2NH$, $LiBH_4$—$LiNH_2$, $Li_3AlH_6$, and combinations thereof; the halide-based particles may include, for example only, $LiI$, $Li_3InCl_6$, $Li_2CdCl_4$, $Li_2MgCl_4$, $LiCdI_4$, $Li_2ZnI_4$, $Li_3OCl$, $Li_3YCl_6$, $Li_3YBr_6$, and combinations thereof and the borate-based particles may include, for example only, $Li_2B_4O_7$, $Li_2O$—$B_2O_3$—$P_2O_5$, and combinations thereof.

In various aspects, the first plurality of solid-state electrolyte particles 30 may include one or more electrolyte materials selected from the group consisting of: $Li_2S$—$P_2S_5$ system, $Li_2S$—$P_2S_5$—$MO_x$ system (where $1<x<7$), $Li_2S$—$P_2S_5$—$MS_x$ system (where $1<x<7$), $Li_{10}GeP_2S_{12}$ (LGPS), $Li_6PS_5X$ (where X is Cl, Br, or I) (lithium argyrodite), $Li_7P_2S_8I$, $Li_{10.35}Ge_{1.35}P_{1.65}S_{12}$, $Li_{3.25}Ge_{0.25}P_{0.75}S_4$ (thio-LISICON), $Li_{10}SnP_2S_{12}$, $Li_{10}SiP_2S_{12}$, $Li_{9.54}Si_{1.74}P_{1.44}S_{11.7}O_{0.3}$, $(1-x)P_2S_5$-$xLi_2S$ (where $0.5<x<0.7$), $Li_{3.4}Si_{0.4}P_{0.6}S_4$, $PLi_{10}GeP_2S_{11.7}O_{0.3}$, $Li_{9.6}P_3S_{12}$, $Li_7P_3S_{11}$, $Li_9P_3S_9O_3$, $Li_{10.35}Ge_{1.35}P_{1.63}S_{12}$, $Li_{9.81}Sn_{0.81}P_{2.19}S_{12}$, $Li_{10}(Si_{0.5}Ge_{0.5})P_2S_{12}$, $Li_{10}(Ge_{0.5}Sn_{0.5})P_2S_{12}$, $Li_{10}(Si_{0.5}Sn_{0.5})P_2S_{12}$, $Li_{3.833}Sn_{0.833}As_{0.16}S_4$, $Li_7La_3Zr_2O_{12}$, $Li_{6.2}Ga_{0.3}La_{2.95}Rb_{0.05}Zr_2O_{12}$, $Li_{6.85}La_{2.9}Ca_{0.1}Zr_{1.75}Nb_{0.25}O_{12}$, $Li_{6.25}Al_{0.25}La_3Zr_2O_{12}$, $Li_{6.75}La_3Zr_{1.75}Nb_{0.25}O_{12}$, $Li_{6.75}La_3Zr_{1.75}Nb_{0.25}O_{12}$, $Li_{2+2x}Zn_{1-x}GeO_4$ (where $0<x<1$), $Li_{14}Zn(GeO_4)_4$, $Li_{3+x}(P_{1-x}Si_x)O_4$ (where $0<x<1$), $Li_{3+x}Ge_xV_{1-x}O_4$ (where $0<x<1$), $LiMM'(PO_4)_3$ (where M and M' are independently selected from Al, Ge, Ti, Sn, Hf, Zr, and La), $Li_{3.3}La_{0.53}TiO_3$, $LiSr_{1.65}Zr_{1.3}Ta_{1.7}O_9$, $Li_{2x-y}Sr_{1-x}Ta_yZr_{1-y}O_3$ (where $x=0.75y$ and $0.60<y<0.75$), $Li_{3/8}Sr_{7/16}Nb_{3/4}Zr_{1/4}O_3$, $Li_{3x}La_{(2/3-x)}TiO_3$ (where $0<x<0.25$), aluminum (Al) or niobium (Nb) doped $Li_7La_3Zr_2O_{12}$, antimony (Sb) doped $Li_7La_3Zr_2O_{12}$, gallium (Ga) doped $Li_7La_3Zr_2O_{12}$, chromium (Cr) and/or vanadium (V) substituted $LiSn_2P_3O_{12}$, aluminum (Al) substituted $Li_{1+x+y}Al_xTi_{2-x}Si_yP_{3-y}O_{12}$ (where $0<x<2$ and $0<y<3$), LiI—$Li_4SnS_4$, $Li_4SnS_4$, $Li_3N$, $Li_7PN_4$, $LiSi_2N_3$, $LiBH_4$, $LiBH_4$—LiX (where x=Cl, Br, or I), $LiNH_2$, $Li_2NH$, $LiBH_4$—$LiNH_2$, $Li_3AlH_6$, LiI, $Li_3InCl_6$, $Li_2CdCl_4$, $Li_2MgCl_4$, $LiCdI_4$, $Li_2ZnI_4$, $Li_3OCl$, $Li_2B_4O_7$, $Li_2O$—$B_2O_3$—$P_2O_5$, and combinations thereof.

In certain variations, the first plurality of solid-state electrolyte particles 30 may include one or more electrolyte materials selected from the group consisting of: $Li_2S$—$P_2S_5$ system, $Li_2S$—$P_2S_5$—$MO_x$ system (where $1<x<7$), $Li_2S$—$P_2S_5$—$MS_x$ system (where $1<x<7$), $Li_{10}GeP_2S_{12}$ (LGPS), $Li_6PS_5X$ (where X is Cl, Br, or I) (lithium argyrodite), $Li_7P_2S_8I$, $Li_{10.35}Ge_{1.35}P_{1.65}S_{12}$, $Li_{3.25}Ge_{0.25}P_{0.75}S_4$ (thio-LISICON), $Li_{10}SnP_2S_{12}$, $Li_{10}SiP_2S_{12}$, $Li_{9.54}Si_{1.74}P_{1.44}S_{11.7}Cl_{0.3}$, $(1-x)P_2S_{5-x}Li_2S$ (where $0.5 \le x \le 0.7$), $Li_{3.4}Si_{0.4}P_{0.6}S_4$, $PLi_{10}GeP_2S_{11.7}O_{0.3}$, $Li_{9.6}P_3S_{12}$, $Li_7P_3S_{11}$, $Li_9P_3S_9O_3$, $Li_{10.35}Ge_{1.35}P_{1.63}S_{12}$, $Li_{9.81}Sn_{0.81}P_{2.19}S_{12}$, $Li_{10}(Si_{0.5}Ge_{0.5})P_2S_{12}$, $Li_{10}(Ge_{0.5}Sn_{0.5})P_2S_{12}$, $Li_{10}(Si_{0.5}Sn_{0.5})P_2S_{12}$, $Li_{3.833}Sn_{0.833}As_{0.16}S_4$, and combinations thereof.

Although not illustrated, the skilled artisan will recognize that in certain instances, one or more binder particles may be mixed with the solid-state electrolyte particles 30. For example, in certain aspects the solid-state electrolyte layer 26 may include greater than or equal to about 0 wt. % to less than or equal to about 10 wt. %, and in certain aspects, optionally greater than or equal to about 0.5 wt. % to less than or equal to about 10 wt. %, of the one or more binders. The one or more polymeric binders may include, for example only, polyvinylidene difluoride (PVDF), polytetrafluoroethylene (PTFE), ethylene propylene diene monomer (EPDM) rubber, nitrile butadiene rubber (NBR), styrene-butadiene rubber (SBR), and lithium polyacrylate (LiPAA).

The negative electrode 22 may be formed from a lithium host material that is capable of functioning as a negative terminal of a lithium-ion battery. The negative electrode 22 may be in the form of a layer having a thickness greater than or equal to about 5 μm to less than or equal to about 400 μm, and in certain aspects, optionally greater than or equal to about 10 μm to less than or equal to about 300 μm. In certain variations, the negative electrode 22 may be defined by a plurality of the negative solid-state electroactive particles 50. The negative solid-state electroactive particles 50 may have an average particle diameter greater than or equal to about 0.01 μm to less than or equal to about 50 and in certain aspects, optionally greater than or equal to about 1 μm to less than or equal to about 20 μm.

In certain instances, as illustrated, the negative electrode 22 may be a composite comprising a mixture of the negative solid-state electroactive particles 50 and the second plurality of solid-state electrolyte particles 90. For example, the negative electrode 22 may include greater than or equal to about 30 wt. % to less than or equal to about 98 wt. %, and in certain aspects, optionally greater than or equal to about 50 wt. % to less than or equal to about 95 wt. %, of the negative solid-state electroactive particles 50 and greater than or equal to about 0 wt. % to less than or equal to about 50 wt. %, and in certain aspects, optionally greater than or equal to about 5 wt. % to less than or equal to about 20 wt. %, of the second plurality of solid-state electrolyte particles 90. The negative electrodes 22 may have an interparticle porosity 82 between the negative solid-state electroactive particles 50 and/or the solid-state electrolyte particles 90 that is greater than or equal to about 0 vol. % to less than or equal to about 50 vol. %, and in certain aspects, optionally greater than or equal to about 2 vol. % to less than or equal to about 20 vol. %.

The second plurality of solid-state electrolyte particles 90 may be the same as or different from the first plurality of solid-state electrolyte particles 30. In certain variations, the negative solid-state electroactive particles 50 may comprise one or more carbonaceous negative electroactive materials, such as graphite, graphene, hard carbon, soft carbon, and carbon nanotubes (CNTs). In other variations, the negative solid-state electroactive particles 50 may be silicon-based comprising, for example, a silicon alloy and/or silicon-graphite mixture. In still other variations, the negative electrode 22 may include a lithium alloy or a lithium metal. In still further variations, the negative electrode 22 may comprise one or more negative electroactive materials, such as lithium titanium oxide ($Li_4Ti_5O_{12}$), metal oxides (e.g., $TiO_2$ and/or $V_2O_5$), metal sulfides (e.g., FeS), transition metals (e.g., tin (Sn)), and other lithium-accepting materials. Thus, the negative solid-state electroactive particles 50 may be selected from the group including, for example only, lithium, graphite, graphene, hard carbon, soft carbon, carbon nanotubes, silicon, silicon-containing alloys, tin-containing alloys, and any combination thereof.

In certain variations, the negative electrode 22 further includes one or more conductive additives and/or binder materials. For example, the negative solid-state electroactive particles 50 (and/or second plurality of solid-state electrolyte particles 90) may be optionally intermingled with one or more electrically conductive materials (not shown) that provide an electron conduction path and/or at least one polymeric binder material (not shown) that improves the structural integrity of the negative electrode 22.

For example, the negative solid-state electroactive particles 50 (and/or second plurality of solid-state electrolyte particles 90) may be optionally intermingled with binders, such as polyvinylidene difluoride (PVDF), poly(vinylidene fluoride-co-hexafluoropropylene) (PVDF-HFP), polytetrafluoroethylene (PTFE), sodium carboxymethyl cellulose (CMC), ethylene propylene diene monomer (EPDM) rubber, nitrile butadiene rubber (NBR), styrene-butadiene rubber (SBR), styrene ethylene butylene styrene copolymer (SEBS), polyethylene glycol (PEO), and/or lithium polyacrylate (LiPAA) binders. Electrically conductive materials may include, for example, carbon-based materials or a conductive polymer. Carbon-based materials may include, for example, particles of graphite, acetylene black (such as KETCHEN™ black or DENKA™ black), carbon fibers and nanotubes, graphene (such as graphene oxide), carbon black (such as Super P), and the like. Examples of a conductive polymer may include polyaniline, polythiophene, polyacetylene, polypyrrole, and the like. In certain aspects, mixtures of the conductive additives and/or binder materials may be used.

The negative electrode 22 may include greater than or equal to about 0 wt. % to less than or equal to about 30 wt. %, and in certain aspects, optionally greater than or equal to about 2 wt. % to less than or equal to about 10 wt. %, of the one or more electrically conductive additives; and greater than or equal to about 0 wt. % to less than or equal to about 20 wt. %, and in certain aspects, optionally greater than or equal to about 1 wt. % to less than or equal to about 10 wt. %, of the one or more binders.

The positive electrode 24 may be formed from a lithium-based or electroactive material that can undergo lithium intercalation and deintercalation while functioning as the positive terminal of the battery 20. The positive electrode 24 may be in the form of a layer having a thickness greater than or equal to about 5 μm to less than or equal to about 400 μm, and in certain aspects, optionally greater than or equal to about 10 μm to less than or equal to about 300 μm. In certain variations, the positive electrode 24 may be defined by a plurality of the positive solid-state electroactive particles 60. The positive solid-state electroactive particles 60 may have an average particle diameter greater than or equal to about 0.01 μm to less than or equal to about 50 and in certain aspects, optionally greater than or equal to about 1 μm to less than or equal to about 20 μm.

In certain instances, as illustrated, the positive electrode 24 is a composite comprising a mixture of the positive solid-state electroactive particles 60 and the third plurality of solid-state electrolyte particles 92. For example, the positive electrode 24 may include greater than or equal to about 30 wt. % to less than or equal to about 98 wt. %, and in certain aspects, optionally greater than or equal to about 50 wt. % to less than or equal to about 95 wt. %, of the positive solid-state electroactive particles 60 and greater than or equal to about 0 wt. % to less than or equal to about 50 wt. %, and in certain aspects, optionally greater than or equal to about 5 wt. % to less than or equal to about 20 wt. %, of the third plurality of solid-state electrolyte particles 92. The positive electrodes 24 may have an interparticle porosity 84 between the positive solid-state electroactive particles 60 and/or the solid-state electrolyte particles 92 that is greater than or equal to about 0 vol. % to less than or equal to about 50 vol. %, and in certain aspects, optionally greater than or equal to about 2 vol. % to less than or equal to about 20 vol. %.

The third plurality of solid-state electrolyte particles 92 may be the same as or different from the first and/or second pluralities of solid-state electrolyte particles 30, 90.

In certain variations, the positive electrode 24 may be one of a layered-oxide cathode, a spinel cathode, and a polyanion cathode. For example, in the instances of a layered-oxide cathode (e.g., rock salt layered oxides), the positive solid-state electroactive particles 60 may comprise one or more positive electroactive materials selected from $LiCoO_2$, $LiNi_xMn_yCo_{1-x-y}O_2$ (where $0 \leq x \leq 1$ and $0 \leq y \leq 1$), $LiNi_xMn_yAl_{1-x-y}O_2$ (where $0 < x \leq 1$ and $0 < y \leq 1$), $LiNi_xMn_{1-x}O_2$ (where $0 \leq x \leq 1$), and $Li_{1+x}MO_2$ (where $0 \leq x \leq 1$) for solid-state lithium-ion batteries. The spinel cathode may include one or more positive electroactive materials, such as $LiMn_2O_4$ and $LiNi_{0.5}Mn_{1.5}O_4$. The polyanion cathode may include, for example, a phosphate, such as $LiFePO_4$, $LiVPO_4$, $LiV_2(PO_4)_3$, $Li_2FePO_4F$, $Li_3Fe_3(PO_4)_4$, or $Li_3V_2(PO_4)F_3$ for lithium-ion batteries, and/or a silicate, such as $LiFeSiO_4$ for lithium-ion batteries. In this fashion, in various aspects, the positive solid-state electroactive particles 60 may comprise one or more positive electroactive materials selected from the group consisting of $LiCoO_2$, $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), $Li_{1+x}MO_2$ (where $0 \leq x \leq 1$), $LiMn_2O_4$, $LiNi_xMn_{1.5}O_4$, $LiFePO_4$, $LiVPO_4$, $LiV_2(PO_4)_3$, $Li_2FePO_4F$, $Li_3Fe_3(PO_4)_4$, $Li_3V_2(PO_4)F_3$, $LiFeSiO_4$, and combinations thereof. In certain aspects, the positive solid-state electroactive particles 60 may be coated (for example, by $LiNbO_3$ and/or $Al_2O_3$) and/or the positive electroactive material may be doped (for example, by aluminum and/or magnesium).

In other variations, the positive electrode 24 include low-voltage cathode materials (e.g., <3.0 V). For example, the positive solid-state electroactive particles 60 may include lithiated metal oxides, lithium metal sulfides (e.g., $LiTiS_2$), lithium sulfide, sulfur, and the like.

In each instance, the positive electrode 24 may further include one or more conductive additives and/or binder materials. For example, the positive solid-state electroactive particles 60 (and/or third plurality of solid-state electrolyte particles 92) may be optionally intermingled with one or more electrically conductive materials (not shown) that provide an electron conduction path and/or at least one polymeric binder material (not shown) that improves the structural integrity of the positive electrode 24.

For example, the positive solid-state electroactive particles 60 (and/or third plurality of solid-state electrolyte particles 92) may be optionally intermingled with binders, like polyvinylidene difluoride (PVDF), poly(vinylidene fluoride-co-hexafluoropropylene) (PVDF-HFP), polytetrafluoroethylene (PTFE), sodium carboxymethyl cellulose (CMC), ethylene propylene diene monomer (EPDM) rubber, nitrile butadiene rubber (NBR), styrene-butadiene rubber (SBR), styrene ethylene butylene styrene copolymer (SEBS), polyethylene glycol (PEO), and/or lithium polyacrylate (LiPAA) binders. Electrically conductive materials may include, for example, carbon-based materials or a conductive polymer. Carbon-based materials may include, for example, particles of graphite, acetylene black (such as KETCHEN™ black or DENKA™ black), carbon fibers and nanotubes, graphene (such as graphene oxide), carbon black (such as Super P), and the like. Examples of a conductive polymer may include polyaniline, polythiophene, polyacetylene, polypyrrole, and the like. In certain aspects, mixtures of the conductive additives and/or binder materials may be used.

The positive electrode 24 may include greater than or equal to about 0 wt. % to less than or equal to about 30 wt. %, and in certain aspects, optionally greater than or equal to about 2 wt. % to less than or equal to about 10 wt. %, of the one or more electrically conductive additives; and greater than or equal to about 0 wt. % to less than or equal to about 20 wt. %, and in certain aspects, optionally greater than or equal to about 1 wt. % to less than or equal to about 10 wt. %, of the one or more binders.

As illustrated in FIG. 1A, direct contact between the solid-state electroactive particles 50, 60 and/or the solid-state electrolyte particles 30, 90, 92 may be much lower than the contact between a liquid electrolyte and solid-state electroactive particles in comparable non-solid-state batteries. For example, a battery 20 in green form may have an overall solid-state electrolyte interparticle porosity that is greater than or equal to about 10 vol. % to less than or equal to about 40 vol. %. In certain variations, a polymeric gel electrolyte (e.g., a semi-solid electrolyte) may be disposed within a solid-state battery so as to wet interfaces and/or fill void spaces between the solid-state electrolyte particles and/or the solid-state active material particles. However, polymeric gel electrolytes often do not have sufficient electrochemical stabilities to match both anode and cathode requirements simultaneously. As such, electrochemical decomposition of the polymeric gel electrolyte may occur continuously at one or both of the anode and cathode, resulting in interface contact loss between the solid-state electrolyte particles and the solid-state electroactive particles.

In various aspects, the present disclosure provides a polymeric gel electrolyte system that includes first, second, and third polymeric gel electrolytes. For example, as illustrated in FIG. 1B, the battery 20 may include a first polymeric gel electrolyte 182, a second polymeric gel electrolyte 180, and a third polymeric gel electrolyte 184.

The first polymeric gel electrolyte 182 may fill voids or wet interfaces in the negative electrode 22 between the negative solid-state electroactive particles 50 and/or the solid-state electrolyte particles 90. For example, the negative electrode 22 may include greater than or equal to about 0.5 wt. % to less than or equal to about 30 wt % of the first polymeric gel electrolyte 182, and the negative electrode 22 including the first polymeric gel electrolyte 182 may have an interparticle porosity of greater than or equal to about 0.5 vol. % to less than or equal to about 30 vol. %. The first polymeric gel electrolyte 182 may be a soft and highly elastic gel electrolyte. The first polymeric gel electrolyte 182 may be non-flowable, for example, having a viscosity greater than or equal to about 10,000 centipoise at 25° C.

In various aspects, the first polymeric gel electrolyte 182 includes a first polymer host, a first liquid electrolyte, and a first or anode additive. For example, the first polymeric gel electrolyte 182 may include greater than or equal to about 0.1 wt. % to less than or equal to about 80 wt. %, optionally greater than or equal to about 0.1 wt. % to less than or equal to about 50 wt. %, optionally greater than or equal to about 0.1 wt. % to less than or equal to about 30 wt. %, and in certain aspects, optionally greater than or equal to about 0.1 wt. % to less than or equal to about 15 wt. %, of the first polymer host; greater than or equal to about 5 wt. % to less than or equal to about 90 wt. %, and in certain aspects, optionally greater than or equal to about 10 wt. % to less than or equal to about 70 wt. %, of the first liquid electrolyte; and greater than 0 wt. % to less than or equal to about 15 wt. %, and in certain aspects, optionally greater than or equal to about 0.5 wt. % to less than or equal to about 10 wt. %, of the first additive. In various aspects, an amount of the first polymer host in the first polymeric gel electrolyte 182 is less than or equal to about 15 wt. %, and the amount of the first polymer host in the first polymer gel electrolyte 182 is less than the amount of the second polymer host in the second polymeric gel electrolyte 180. The amount of the first polymer host in the first polymer gel electrolyte 182 may be the same as or different from the third polymer host in the third polymer gel electrolyte 184.

The first polymer host may include, for example, poly (ethylene oxide) (PEO), poly(vinylidene fluoride-co-hexafluoropropylene) (PVdF-HFP), poly(methyl methacrylate) (PMMA), carboxymethyl cellulose (CMC), polyacrylonitrile (PAN), polyvinylidene difluoride (PVDF), poly(vinyl alcohol) (PVA), polyvinylpyrrolidone (PVP), lithium polyacrylate (LiPAA), and combinations thereof.

The first liquid electrolyte may include a lithium salt and a solvent. The lithium salt may include, for example, lithium hexafluoroarsenate (LiAsF$_6$), lithium hexafluorophosphate (LiPF$_6$), lithium bis(fluorosulfonyl)imide (LiFSI), lithium perchlorate (LiClO$_4$), lithium tetrafluoroborate (LiBF$_4$), lithium-cyclo-difluoromethane-1,1-bis(sulfonyl)imide (LiDMSI), lithium bis(trifluoromethanesulfonyl)imide (LiTFSI), lithium bis(pentafluoroethanesulfonyl)imide (LiBETI), lithium bis(oxalato)borate (LiBOB), lithium difluoro (oxalato)borate (LiDFOB), lithium bis(monofluoromalonato)borate (LiBFMB), lithium difluorophosphate (LiPO$_2$F$_2$), lithium fluoride (LiF), and combinations thereof.

In certain aspects, the solvent dissolves the lithium salt to enable good lithium ion conductivity, while exhibiting a low vapor pressure (e.g., less than about 10 mmHg at 25° C.) to match the fabrication process. The solvent may include, for example, carbonate solvents (such as, ethylene carbonate (EC), propylene carbonate (PC), glycerol carbonate, vinylene carbonate, fluoroethylene carbonate, 1,2-butylene carbonate, and the like), lactones (such as, γ-butyrolactone, δ-valerolactone, and the like), nitriles (such as, succinonitrile, glutaronitrile, adiponitrile, and the like), sulfones (such as, tetramethylene sulfone, ethyl methyl sulfone, vinyl sulfone, phenyl sulfone, 4-fluorophenyl sulfone, benzyl sulfone, and the like), ethers (such as, triethylene glycol dimethylether (triglyme, G3), tetraethylene glycol dimethylether (tetraglyme, G4), 1,3-dimethyoxy propane, 1,4-dioxane, and the like), phosphates (such as, triethyl phosphate, trimethyl phosphate, and the like), ionic liquids including ionic liquid cations (such as, 1-ethyl-3-methylimidazolium ([Emim]$^+$), 1-propyl-1-methylpiperidinium ([PP$_{13}$]$^+$), 1-butyl-1-methylpiperidinium ([PP$_{14}$]$^+$), 1-methyl-1-ethylpyrrolidinium ([Pyr$_{12}$]$^+$), 1-propyl-1-methylpyrrolidinium ([Pyr$_{13}$]$^+$), 1-butyl-1-methylpyrrolidinium ([Pyr$_{14}$]$^+$), and the like) and ionic liquid anions (such as, bis(trifluoromethanesulfonyl)imide (TFSI), bis(fluorosulfonyl imide (FS), and the like), and combinations thereof.

The first or anode additive may be selected to encourage formation of a robust and thin solid-electrolyte interface (SEI) layer on or adjacent to one or more surfaces of the negative electrode 22, for example on the surface of the negative electrode 22 opposing the electrolyte layer 26. In various aspects, the first additive may include, for example, unsaturated carbon bond containing compounds (such as, vinylene carbonate (VC), vinyl ethylene carbonate (VEC), and the like), sulfur-containing compounds (such as, ethylene sulfite (ES), propylene sulfite (PyS), and the like), halogen-containing compounds (such as, fluoroethylene carbonate (FEC), chloro-ethylene carbonate (Cl-EC), and the like), methyl substituted glycolide derivatives, maleimide (MI) additives, additives or compounds containing electron withdrawing groups, and combinations thereof.

The second polymeric gel electrolyte 180 may fill voids in the electrolyte layer 26 between the solid-state electrolyte particles 30. For example, the electrolyte layer 26 may include greater than or equal to about 0.5 wt. % to less than or equal to about 99 wt. % of the second polymeric gel electrolyte 180. In certain variations, the second polymeric gel electrolyte 180 is different from the first polymeric gel electrolyte 182.

The second polymeric gel electrolyte 180 may have a high lithium ionic conductivity and low electronic conductivity. Like the first polymeric gel electrolyte 182, the second polymeric gel electrolyte 180 may be non-flowable, for example, having a viscosity greater than or equal to about 10,000 centipoise at 25° C. The second polymeric gel electrolyte 180 may have a tensile strength greater than or equal to about 0.1 MPa.

In various aspects, the second polymeric gel electrolyte 180 includes a second polymer host and a second liquid electrolyte. For example, the second polymeric gel electrolyte 180 may include greater than or equal to about 0.1 wt. % to less than or equal to about 50 wt. %, and in certain aspects, optionally greater than or equal to about 10 wt. % to less than or equal to about 50 wt. %, of the second polymer host; and greater than or equal to about 5 wt. % to less than or equal to about 90 wt. % of the second liquid electrolyte. In various aspects, an amount of the second polymer host in the second polymeric gel electrolyte 180 is greater than or equal to about 10 wt. %, and the amount of the second polymer host in the second polymeric gel electrolyte 180 may be greater than an amount of the first polymer host in the first polymeric gel electrolyte 182 and an amount of the second polymer host in the third polymeric gel electrolyte 184.

The second polymer host may include, for example, nitrile-based solid polymer electrolytes (such as, poly(acrylonitrile) (PAN) and the like), polyether (such as, poly(ethylene oxide) (PEO), poly(ethylene glycol) (PEG), and the like), polyester-based solid polymer (such as, polyethylene carbonate (PEC), poly(trimethylene carbonate) (PTMC), poly(propylene carbonate) (PPC), and the like), polyvinylidene difluoride (PVDF), poly(vinylidene fluoride-co-hexafluoropropylene) (PVDF-HFP), and combinations thereof.

The second liquid electrolyte may include a lithium salt and a solvent (e.g., greater than 0 mol/L to less than or equal to about 3 mol/L). The lithium salt may include, for example, lithium bis-trifluoromethanesulfonimide (LiTFSI), lithium tetrafluoroborate (LiBF$_4$), lithium bis(oxalate)borate (LiBOB), lithium difluoro(oxalato) borate (LiODFB), lithium difluorophosphate (LiPO$_2$F$_2$), lithium fluoride (LiF), and combinations thereof. The solvent may include, for example, ethylene carbonate (EC), propylene carbonate (PC), gamabutyrolactone (GBL), tetraethyl phosphate (TEP), fluoroethylene carbonate (FEC), and combinations thereof.

The third polymeric gel electrolyte 184 may fill voids in the positive electrode 24 between the positive solid-state electroactive particles 60 and/or the solid-state electrolyte particles 92. For example, the positive electrode 24 may include greater than or equal to about 0.5 wt. % to less than or equal to about 30 wt % of the third polymeric gel electrolyte 184, and the positive electrode 24 including the third polymeric gel electrolyte 184 may have an interparticle porosity of greater than or equal to about 0.5 vol. % to less than or equal to about 30 vol. %. The third polymeric gel electrolyte 184 is different from the first polymeric gel electrolyte 182 and the second polymeric gel electrolyte 180.

Like the first polymeric gel electrolyte 182, the third polymeric gel electrolyte 184 may be a soft and highly elastic gel electrolyte. The third polymeric gel electrolyte 184, however, may also be thermodynamically stable in high potential ranges. Like the first and second polymeric gel electrolytes 182, 180, the third polymeric gel electrolyte 184 may be non-flowable, for example, having a viscosity greater than or equal to about 10,000 centipoise.

In various aspects, the third polymeric gel electrolyte 184 includes a third polymer host, a third liquid electrolyte, and a second or cathode additive. For example, the third polymer gel electrolyte 184 may include greater than or equal to about 0.1 wt. % to less than or equal to about 80 wt. %, optionally greater than or equal to about 0.1 wt. % to less than or equal to about 50 wt. %, optionally greater than or equal to about 0.1 wt. % to less than or equal to about 30 wt. %, and in certain aspects, optionally greater than or equal to about 0.1 wt. % to less than or equal to about 15 wt. %, of the third polymer host; greater than or equal to about 5 wt. % to less than or equal to about 90 wt. %, and in certain aspects, optionally greater than or equal to about 10 wt. % to less than or equal to about 70 wt. %, of the third liquid electrolyte; and greater than 0 wt. % to less than or equal to about 10 wt. %, and in certain aspects, optionally greater than or equal to about 0.5 wt. % to less than or equal to about 10 wt. %, of the second additive. In various aspects, an amount of the third polymer host in the third polymeric gel electrolyte 184 is less than or equal to about 15 wt. %, and the amount of the third polymeric gel electrolyte 184 is less than the amount of the second polymer host in the second polymeric gel electrolyte 180. The amount of the third polymer host in the third polymeric gel electrolyte 184 may be the same as or different from the first polymer host in the first polymer gel electrolyte 182.

The third polymer host may be the same or different from the first polymer host. For example, the third polymer host may include poly(ethylene oxide) (PEO), poly(vinylidene fluoride-co-hexafluoropropylene) (PVdF-HFP), poly (methyl methacrylate) (PMMA), carboxymethyl cellulose (CMC), polyacrylonitrile (PAN), polyvinylidene difluoride (PVDF), poly(vinyl alcohol) (PVA), polyvinylpyrrolidone (PVP), lithium polyacrylate (LiPAA), and combinations thereof.

Like the first liquid electrolyte, the third liquid electrolyte includes a lithium salt and a solvent. The third liquid electrolyte may be the same as or different from the first liquid electrolyte. For example, the lithium salt may include lithium hexafluoroarsenate (LiAsF$_6$), lithium hexafluorophosphate (LiPF$_6$), lithium bis(fluorosulfonyl)imide (LiFSI), lithium perchlorate (LiClO$_4$), lithium tetrafluoroborate (LiBF$_4$), lithium-cyclo-difluoromethane-1,1-bis(sulfonyl)imide (LiDMSI), lithium bis(trifluoromethanesulfonyl) imide (LiTFSI), lithium bis(pentafluoroethanesulfonyl) imide (LiBETI), lithium bis(oxalato)borate (LiBOB), lithium difluoro(oxalato)borate (LiDFOB), lithium bis (monofluoromalonato)borate (LiBFMB), lithium difluorophosphate (LiPO$_2$F$_2$), lithium fluoride (LiF), and combinations thereof.

The solvent may include, for example, carbonate solvents (such as, ethylene carbonate (EC), propylene carbonate (PC), glycerol carbonate, vinylene carbonate, fluoroethylene carbonate, 1,2-butylene carbonate, and the like), lactones (such as, γ-butyrolactone, δ-valerolactone, and the like), nitriles (such as, succinonitrile, glutaronitrile, adiponitrile, and the like), sulfones (such as, tetramethylene sulfone, ethyl methyl sulfone, vinyl sulfone, phenyl sulfone, 4-fluorophenyl sulfone, benzyl sulfone, and the like), ethers (such as, triethylene glycol dimethylether (triglyme, G3), tetraethylene glycol dimethylether (tetraglyme, G4), 1,3-dimethyoxy propane, 1,4-dioxane, and the like), phosphates (such as, triethyl phosphate, trimethyl phosphate, and the like), ionic liquids including ionic liquid cations (such as, 1-ethyl-3-methylimidazolium ([Emim]$^+$), 1-propyl-1-methylpiperidinium ([PP$_{13}$]$^+$), 1-butyl-1-methylpiperidinium ([PP$_{14}$]$^+$), 1-methyl-1-ethylpyrrolidinium ([Pyr$_{12}$]$^+$), 1-propyl-1-methylpyrrolidinium ([Pyr$_{13}$]$^+$), 1-butyl-1-methylpyrrolidinium ([Pyr$_{14}$]$^+$), and the like) and ionic liquid anions (such as, bis(trifluoromethanesulfonyl)imide (TFSI), bis (fluorosulfonyl imide (FS), and the like), and combinations thereof.

The second or cathode additive may be selected to passivate the positive electrode 24 at high temperatures (e.g., >45° C.) and to reduce metal dissolution. For example, the second additive may oxidize prior to the solvent(s) so as to cover one or more surfaces of the electrode so as to limit or prevent the oxidative decomposition of the electrolytes. In various aspects, the second additive may include, for example, boron-containing compounds (such as, lithium bis(oxalato)borate (LiBOB), lithium difluoro(oxalato)borate (LiDFOB), tris(trimethylsilyl)borate (TMSB), and the like), silicon-containing compounds (such as, tris(trimethylsilyl) phosphate (TMSP), tris(trimethylsilyl)borate (TMSB), and the like), phosphorus-containing compounds (such as, triphenyl phosphine (TPP), ethyl diphenylphosphinite (EDP), triethyl phosphite (TEP), and the like), compounds containing phenyl, thiophene aniline, and/or maleimide groups (such as, biphenyl (BP), o-terphenyl (OT), 2,2'-bis[4-(4 maleimidophenoxy)phenyl]propane (BMP), and the like), compounds containing aniline, anisole, adamantyl, furan, and/or thiophene groups (such as, N,N-dimethyl-aniline (DMA)), and combinations thereof.

Figure 2:
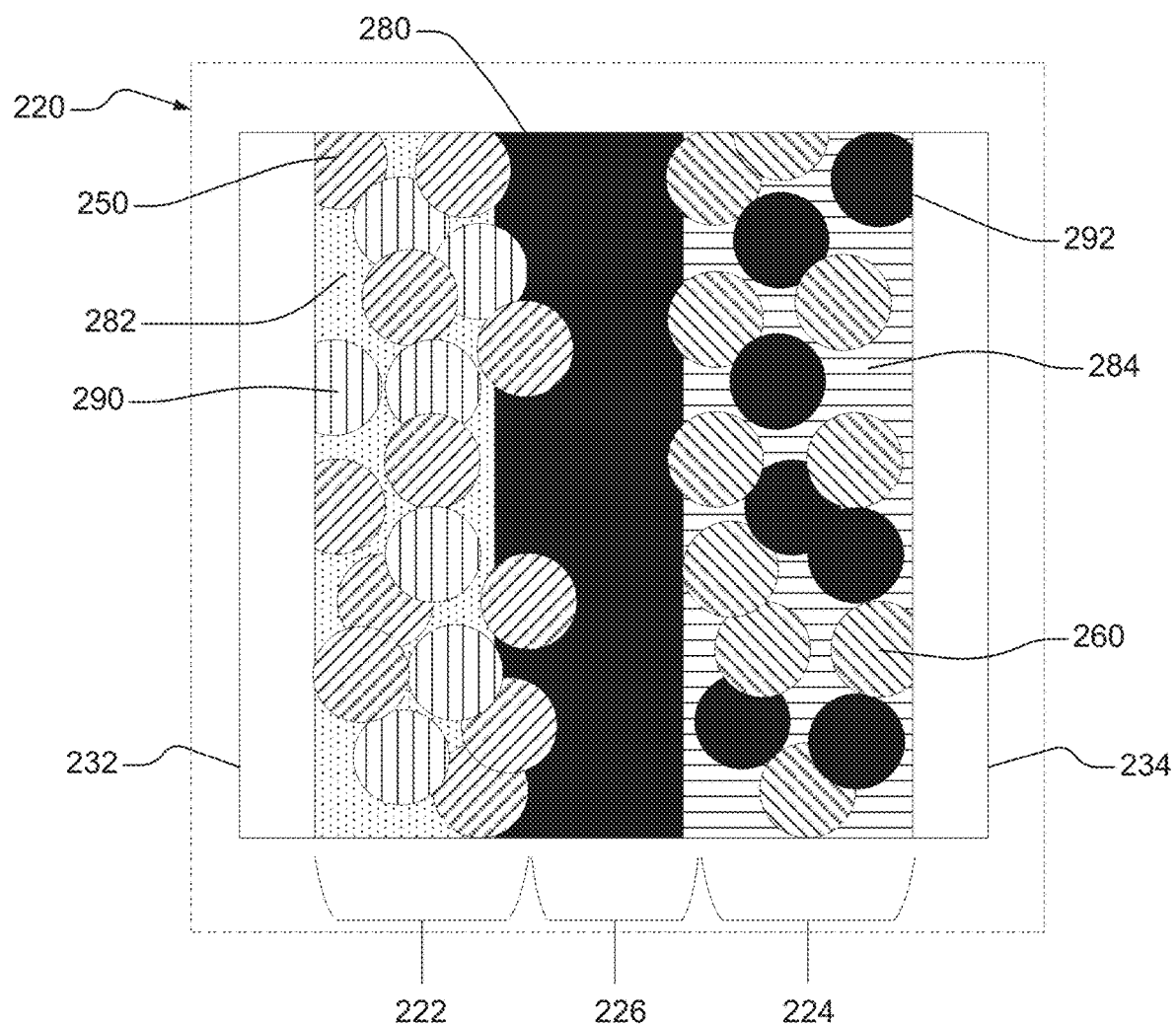
FIG. 2 is another example solid-state battery having a polymeric gel electrolyte system in accordance with various aspects of the present disclosure.

An exemplary and schematic illustration of another solid-state electrochemical cell unit 200 that cycles lithium ions is shown in FIG. 2. Like battery 20, the battery 220 includes a negative electrode (i.e., anode) 222, a first bipolar current collector 232 positioned at or near a first side of the negative electrode 222, a positive electrode (i.e., cathode) 224, a second bipolar current collector 234 positioned at or near a first side of the positive electrode 224, and an electrolyte layer 226 disposed between a second side of the negative electrode 222 and a second side of the positive electrode 224.

As illustrated in FIG. 2, the negative electrode 222 may include a plurality of negative solid-state electroactive particles 250 mixed with an optional first plurality of solid-state electrolyte particles 290. The negative electrode 222 may further include a first polymeric gel electrolyte 282 that fills voids in the negative electrode 222 between the negative solid-state electroactive particles 250 and/or the solid-state electrolyte particles 290. Like the first polymeric gel electrolyte 180 discussed above, the first polymeric gel electrolyte 282 may be a soft and highly elastic gel electrolyte including a first polymer host, a first liquid electrolyte, and a first or anode additive.

The electrolyte layer 226 may be a separating layer that physically separates the negative electrode 222 from the positive electrode 224. The electrolyte layer 226 may be a free-standing membrane 280 defined by a second polymeric gel electrolyte. The free-standing membrane 280 may have a thickness greater than or equal to about 5 μm to less than or equal to about 1,000 μm, and in certain aspects, optionally greater than or equal to about 2 μm to less than or equal to about 100 μm. Similar to the second polymeric gel electrolyte 180 described above, the second polymeric gel electrolyte 280 may be a high lithium ionic conductivity and low electronic conductivity electrolyte including a second polymer host and a second liquid electrolyte.

The positive electrode 224 may include a plurality of positive solid-state electroactive particles 260 mixed with an optional second plurality of solid-state electrolyte particles 292. The positive electrode 224 may further include a third polymeric gel electrolyte 284 that fills voids in the positive electrode 224 between the positive solid-state electroactive particles 260 and/or the solid-state electrolyte particles 292. Like the third polymeric gel electrolyte 184 discussed above, the third polymeric gel electrolyte 284 may be a soft and highly elastic gel electrolyte including a third polymer host, a third liquid electrolyte, and a second or cathode additive.

Figure 3:
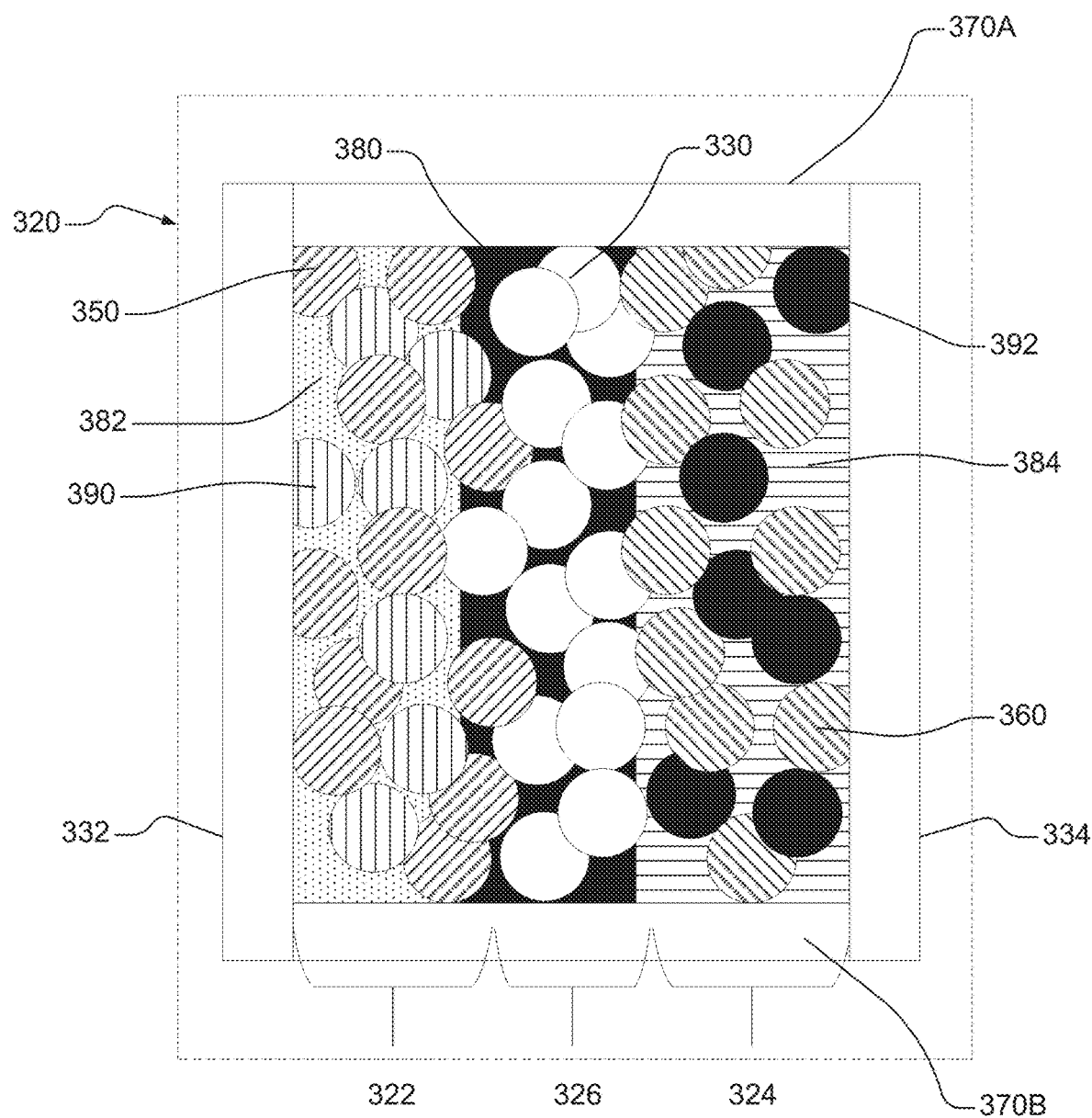
FIG. 3 is another example solid-state battery having a polymeric gel electrolyte system in accordance with various aspects of the present disclosure.

An exemplary and schematic illustration of another solid-state electrochemical cell unit 300 that cycles lithium ions is shown in FIG. 3. Like battery 20 and/or battery 220, the battery 300 includes a negative electrode (i.e., anode) 322, a first bipolar current collector 332 positioned at or near a first side of the negative electrode 322, a positive electrode (i.e., cathode) 324, a second bipolar current collector 334 positioned at or near a first side of the positive electrode 324, and an electrolyte layer 326 disposed between a second side of the negative electrode 322 and a second side of the positive electrode 324.

As illustrated in FIG. 3, the negative electrode 322 may include a plurality of negative solid-state electroactive particles 350 mixed with an optional first plurality of solid-state electrolyte particles 390. The negative electrode 322 may further include a first polymeric gel electrolyte 382 that fills voids in the negative electrode 322 between the negative solid-state electroactive particles 350 and/or the solid-state electrolyte particles 390. Like the first polymeric gel electrolyte 180 discussed above, the first polymeric gel electrolyte 382 may be a soft and highly elastic gel electrolyte including a first polymer host, a first liquid electrolyte, and a first or anode additive.

The electrolyte layer 326 may be a separating layer that physically separates the negative electrode 322 from the positive electrode 324. Similar to electrolyte layer 26, the electrolyte layer 326 may be defined by a second plurality of solid-state electrolyte particles 330 and a second polymeric gel electrolyte 380 may fill voids in the electrolyte 326 between the solid-state electrolyte particles 330. Although not illustrated, in other variations, similar to electrolyte layer 226, the electrolyte layer 326 may be a free-standing membrane defined by the second polymeric gel electrolyte 380. Similar to the second polymeric gel electrolyte 180 described above, the second polymeric gel electrolyte 380 may be a high lithium ionic conductivity and low electronic conductivity electrolyte including a second polymer host and a second liquid electrolyte. For example, the electrolyte layer 326 may include greater than or equal to about 0.01 wt. % to less than or equal to about 50 wt. %, and in certain aspects, optionally greater than or equal to about 10 wt. % to less than or equal to about 50 wt. %, of the second polymer host; greater than or equal to about 0.01 wt. % to less than or equal to about 90 wt. %, and in certain aspects, optionally greater than or equal to about 5 wt. % to less than or equal to about 50 wt. %, of the second liquid electrolyte; and greater than or equal to about 0 wt. % to less than or equal to about 80 wt. %, and in certain aspects, optionally greater than or equal to about 10 wt. % to less than or equal to about 50 wt. %, of the solid-state electrolyte particles 330.

The positive electrode 324 may include a plurality of positive solid-state electroactive particles 360 mixed with an optional third plurality of solid-state electrolyte particles 392. The positive electrode 324 may further include a third polymeric gel electrolyte 384 that fills voids in the positive electrode 324 between the positive solid-state electroactive particles 360 and/or the solid-state electrolyte particles 392. Like the third polymeric gel electrolyte 184 discussed above, the third polymeric gel electrolyte 384 may be a soft and high elastic gel electrolyte including a third polymer host, a third liquid electrolyte, and a second or cathode additive.

As illustrated in FIG. 3, the battery 320 further includes one or more polymer blockers 370A, 370B. The one or more polymer blockers 370A, 370B may be disposed at or adjacent to a border of a cell unit so as to mitigate a potential ionic short-circuit. For example, as illustrated, the one or more polymer blockers 370A, 370B may contact or connect one or more current collectors 332, 334 at or adjacent to the border of a cell unit to fully seal the cell unit. Although FIG. 3 illustrates a polymeric blocker pair 370A, 370B disposed at the respective ends of the cell, the skilled artisan will appreciate that in some aspects, a polymer blocker may be applied to only one end of a particular cell, may be absent from a particular cell, or may be entirely absent from the battery.

The one or more polymer blockers 370A, 370B may include an ionic and electronic insulating material. The ionic and/or electronic insulating material may also be characterized as having a strong adhesion force (for example, greater than or equal to about 0.01 MPa to less than or equal to about 1000 MPa, and in certain aspects, optionally greater than or equal to about 0.1 MPa to less than or equal to about 40 MPa). The ionic and/or electronic insulating material may also be characterized as exhibiting excellent thermostability (for example, stability at greater than or equal to about 40° C. to less than or equal to about 200° C., and in certain aspects, optionally greater than or equal to about 45° C. to less than or equal to about 150° C.). For example, one of more of the polymer blockers 370A, 370B, may include at least one of a hot-melt adhesive (such as urethane resin, polyamide resin, polyolefin resin); a polyethylene resin; a polypropylene resin; a resin containing an amorphous polypropylene resin as a main component and obtained by copolymerizing, for example, ethylene, propylene, and butylene; silicone; a polyimide resin; an epoxy resin; an acrylic resin; a rubber (such as ethylene-propylenediene rubber (EPDM)); an isocyanate adhesive; an acrylic resin adhesive; and a cyanoacrylate adhesive. In various aspects, the one or more polymer blockers 370A, 370B may have a thickness greater than or equal to about 2 µm to less than or equal to about 200 µm.

In various aspects, the present disclosure provides methods for fabricating a battery including a gel electrolyte system, such as the battery 20 illustrated in FIG. 1B, the battery 200 illustrated in FIG. 2, and/or the battery 300 illustrated in FIG. 3. For example, the present disclosure contemplates a method of making a first electrode, where the method generally includes contacting a first precursor liquid with a first or negative electrode precursor in the form of a first or negative electroactive material layer, and concurrently or simultaneously, contacting a second precursor liquid with a second or positive electrode precursor in the form of a second or positive electroactive material layer. The method further includes drying the first precursor liquid to form a gel-assisted first or negative electrode that includes a first polymeric gel electrolyte, and concurrently or simultaneously, drying the second precursor liquid to form a gel-assisted second or positive electrode that includes a second polymeric gel electrolyte. In certain variations, the method may further include, concurrently or simultaneously with the first and/or second contacts, contacting a third precursor liquid with a precursor electrolyte layer including a plurality of solid-state electrolyte particles and drying the third precursor liquid to form a gel-assisted electrolyte layer including a third polymeric gel electrolyte. In other variations, the method may further include, concurrently or simultaneously with the first and/or second contacts, forming a free-standing membrane defined by a polymeric gel. In each instance, the method includes substantially aligning and/or stacking the first or negative electrolyte layer, the second or positive electrolyte layer, and the gel-assisted electrolyte layer and/or free-standing membrane defined by the polymeric gel. Although the above discussion describes a single negative electrode, a single positive electrode, and a single electrolyte layer, the skilled artisan will recognize that the current teachings apply to various other configurations, including those having one or more anodes, one or more cathodes, and one or more electrolyte layers, as well as various current collectors and current collector films with electroactive particle layers disposed on or adjacent to or embedded within one or more surfaces thereof.

Figure 4:
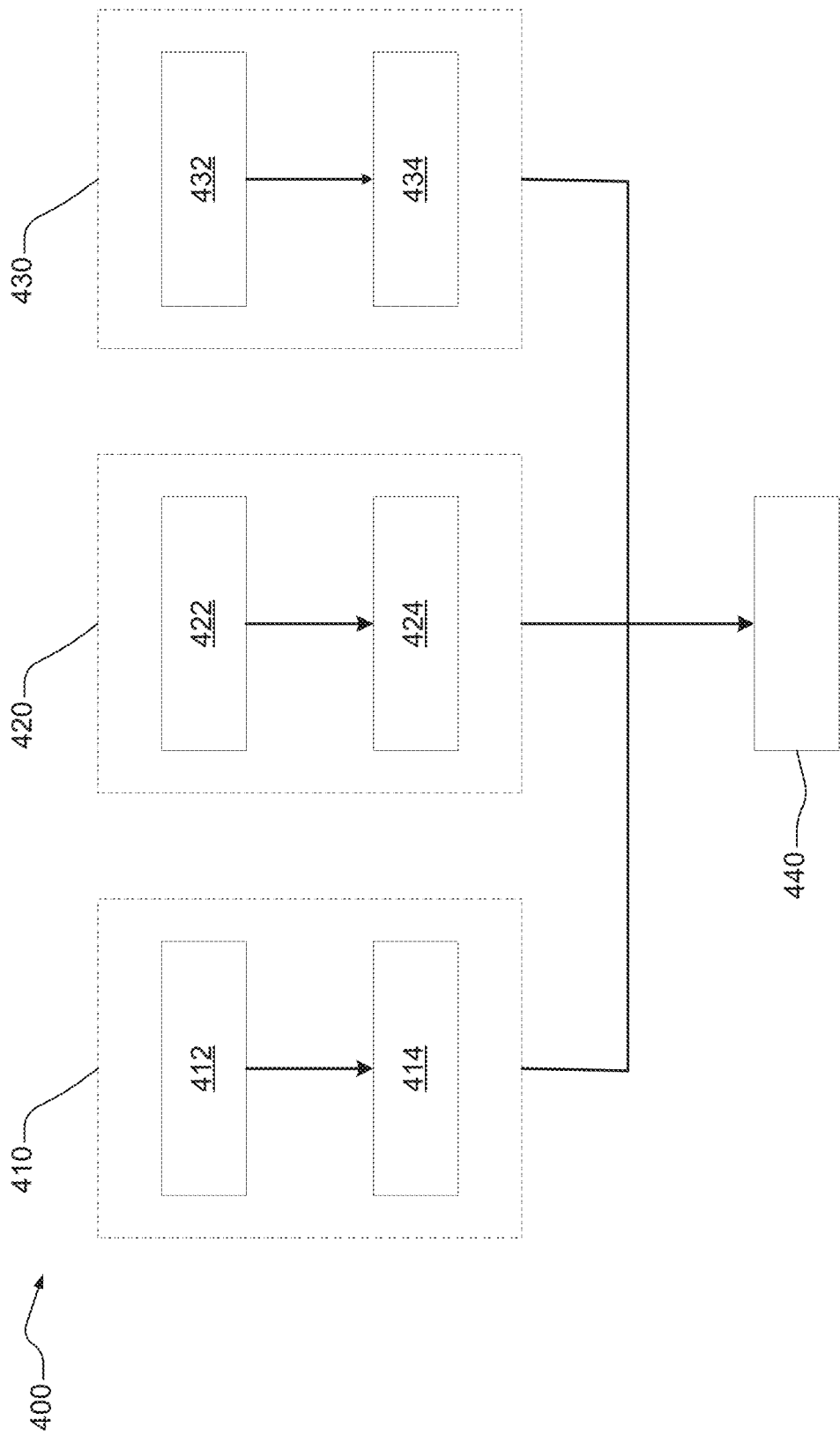
FIG. 4 is a flowchart illustrating an exemplary method for fabricating a battery including a polymeric gel electrolyte system in accordance with various aspects of the present disclosure.

FIG. 4 illustrates an exemplary method 400 for fabricating a battery including a gel electrolyte system, such as the battery 20 illustrated in FIG. 1B.

The method 400 may include preparing 410 a first gel-assisted electrode. Preparing 410 the first gel-assisted electrode may include contacting 412 a first precursor liquid and a first precursor electrode. The first precursor electrode may include a first electroactive material layer disposed on or adjacent to a first surface of a first bipolar current collector. The first electroactive material layer may include a first plurality of solid-state electroactive material particles (e.g., negative solid-state electroactive material particles) and an optional first plurality of solid-state electrolyte particles.

The first precursor liquid may include a first gel precursor and a first liquid electrolyte. For example, the first gel precursor may include a first polymer host and a first or anode additive. The first liquid electrolyte may include a first lithium salt and a first electrolyte solvent. The first precursor liquid may include greater than or equal to about 0.1 wt. % to less than or equal to about 80 wt. %, optionally greater than or equal to about 0.1 wt. % to less than or equal to about 50 wt. %, optionally greater than or equal to about 0.1 wt. % to less than or equal to about 30 wt. %, and in certain aspects, optionally greater than or equal to about 0.1 wt. % to less than or equal to about 15 wt. %, of the first polymer host; greater than or equal to about 5 wt. % to less than or equal to about 90 wt. %, and in certain aspects, optionally greater than or equal to about 10 wt. % to less than or equal to about 70 wt. %, of the first liquid electrolyte; and greater than 0 wt. % to less than or equal to about 15 wt. %, and in certain aspects, optionally greater than or equal to about 0.5 wt. % to less than or equal to about 10 wt. %, of the first additive. The first precursor liquid also includes greater than or equal to about 20 wt. % to less than or equal to about 80 wt. % of a first dilute solvent.

The first polymer host may include, for example, poly (ethylene oxide) (PEO), poly(vinylidene fluoride-co-hexafluoropropylene) (PVdF-HFP), poly(methyl methacrylate) (PMMA), carboxymethyl cellulose (CMC), polyacrylonitrile (PAN), polyvinylidene difluoride (PVDF), poly(vinyl alcohol) (PVA), polyvinylpyrrolidone (PVP), lithium polyacrylate (LiPAA), and combinations thereof. In certain variations, the first gel precursor may include poly (vinylidene fluoride-co-hexafluoropropylene) (PVdF-HFP), by way of non-limiting example. For example, the first gel precursor may include about 2.5 wt. % of poly(vinylidene fluoride-co-hexafluoropropylene) (PVdF-HFP), by way of non-limiting example.

The first or anode additive may include, for example, unsaturated carbon bond containing compounds (such as, vinylene carbonate (VC), vinyl ethylene carbonate (VEC), and the like), sulfur-containing compounds (such as, ethylene sulfite (ES), propylene sulfite (PyS), and the like), halogen-containing compounds (such as, fluoroethylene carbonate (FEC), chloro-ethylene carbonate (Cl-EC), and the like), methyl substituted glycolide derivatives, maleimide (MI) additives, additives or compounds containing electron withdrawing groups, and combinations thereof. In certain variations, the first gel precursor may include vinyl ethylene carbonate (VEC), by way of non-limiting example. For example, the first gel precursor may include about 2.5 wt. % of vinyl ethylene carbonate (VEC), by way of non-limiting example.

The first lithium salt may include, for example, lithium hexafluoroarsenate ($LiAsF_6$), lithium hexafluorophosphate ($LiPF_6$), lithium bis(fluorosulfonyl)imide (LiFSI), lithium perchlorate ($LiClO_4$), lithium tetrafluoroborate ($LiBF_4$), lithium-cyclo-difluoromethane-1,1-bis(sulfonyl)imide (LiDMSI), lithium bis(trifluoromethanesulfonyl)imide (LiTFSI), lithium bis(pentafluoroethanesulfonyl)imide (LiBETI), lithium bis(oxalato)borate (LiBOB), lithium difluoro (oxalato)borate (LiDFOB), lithium bis(monofluoromalonato)borate (LiBFMB), lithium difluorophosphate ($LiPO_2F_2$), lithium fluoride (LiF), and combinations thereof. In certain variations, the first precursor liquid may include 0.4 M of lithium bis(trifluoromethanesulfonyl)imide (LiTFSI) and 0.4 M lithium tetrafluoroborate ($LiBF_4$), by way of non-limiting example.

In certain aspects, the first electrolyte solvent dissolves the first lithium salt to enable good lithium ion conductivity, while exhibiting a low vapor pressure (e.g., less than about 10 mmHg at 25° C.) to match the fabrication process. The first electrolyte solvent may include, for example, carbonate solvents (such as, ethylene carbonate (EC), propylene carbonate (PC), glycerol carbonate, vinylene carbonate, fluoroethylene carbonate, 1,2-butylene carbonate, and the like), lactones (such as, γ-butyrolactone, δ-valerolactone, and the like), nitriles (such as, succinonitrile, glutaronitrile, adiponitrile, and the like), sulfones (such as, tetramethylene sulfone, ethyl methyl sulfone, vinyl sulfone, phenyl sulfone, 4-fluorophenyl sulfone, benzyl sulfone, and the like), ethers (such as, triethylene glycol dimethylether (triglyme, G3), tetraethylene glycol dimethylether (tetraglyme, G4), 1,3-dimethyoxy propane, 1,4-dioxane, and the like), phosphates (such as, triethyl phosphate, trimethyl phosphate, and the like), ionic liquids including ionic liquid cations (such as, 1-ethyl-3-methylimidazolium ($[Emim]^+$), 1-propyl-1-methylpiperidinium ($[PP_{13}]^+$), 1-butyl-1-methylpiperidinium ($[PP_{14}]^+$), 1-methyl-1-ethylpyrrolidinium ($[Pyr_{12}]^+$), 1-propyl-1-methylpyrrolidinium ($[Pyr_{13}]^+$), 1-butyl-1-methylpyrrolidinium ($[Pyr_{14}]^+$), and the like) and ionic liquid anions (such as, bis(trifluoromethanesulfonyl)imide (TFSI), bis (fluorosulfonyl imide (FS), and the like), and combinations thereof. In certain variations, the first precursor liquid may include 1:1 (v/v) of ethylene carbonate (EC) and gamabutyrolactone (GBL), by way of non-limiting example.

The first dilute solvent may include, for example, dimethyl carbonate (DMC), ethyl acetate, acetonitrile, acetone, toluene, diethyl carbonate, 1,2,2-tetrafluoroethyl, 2,2,3,3-tetrafluoropropyl ether, and combinations thereof. For example, the first gel precursor may include dimethyl carbonate (DMC), by way of non-limiting example.

Although not illustrated, in certain variations, the method 400 may include preparing the first precursor liquid. The first precursor liquid may be prepared by adding the first gel precursor to the first liquid electrolyte. For example, in certain variations, about 2.5 wt. % of poly(vinylidene fluoride-co-hexafluoropropylene) (PVdF-HFP) and about 2.5 wt. % of vinyl ethylene carbonate (VEC) may be added to the first liquid electrolyte to form the first precursor liquid, by way of non-limiting example. Similarly, in certain variations, the method 400 may include preparing the first precursor electrode. The first precursor electrode may be prepared by disposing the first plurality of solid-state electroactive material particles and an optional first plurality of solid-state electrolyte particles on or adjacent to one or more surfaces of the first bipolar current collector.

With renewed reference to FIG. 4, as illustrated, preparing 410 the first gel-assisted electrode may further include removing 414 the first dilute solvent (e.g., dimethyl carbonate (DMC)) to form the first gel-assisted electrode including the first polymeric gel electrolyte. The first dilute solvent may be removed 414 by heating or evaporation of the low-boiling point solvent (e.g., dimethyl carbonate (DMC)).

The method 400 may include, concurrently or simultaneously, preparing 420 a second gel-assisted electrode. Preparing 420 the second gel-assisted electrode may include contacting 422 a second precursor liquid and a second precursor electrode. The second precursor electrode may include a second electroactive material layer disposed on or adjacent to a first surface of a second bipolar current collector. The second electroactive material layer may include a second plurality of solid-state electroactive material particles (e.g., positive solid-state electroactive material particles) and an optional second plurality of solid-state electrolyte particles.

The second precursor liquid may include a second gel precursor and a second liquid electrolyte. For example, the second gel precursor may include a second polymer host and a second or cathode additive. The second liquid electrolyte may include a second lithium salt and a second electrolyte solvent. The second precursor liquid may include greater than or equal to about 0.1 wt. % to less than or equal to about 80 wt. %, optionally greater than or equal to about 0.1 wt. % to less than or equal to about 50 wt. %, optionally greater than or equal to about 0.1 wt. % to less than or equal to about 30 wt. %, and in certain aspects, optionally greater than or equal to about 0.1 wt. % to less than or equal to about 15 wt. %, of the second polymer host; greater than or equal to about 5 wt. % to less than or equal to about 90 wt. %, and in certain aspects, optionally greater than or equal to about 10 wt. % to less than or equal to about 70 wt. %, of the second liquid electrolyte; and greater than 0 wt. % to less than or equal to about 15 wt. %, and in certain aspects, optionally greater than or equal to about 0.5 wt. % to less than or equal to about 10 wt. %, of the second additive. The second precursor liquid also includes greater than or equal to about 20 wt. % to less than or equal to about 80 wt. % of a second dilute solvent.

The second polymer host may be the same as or different from the first polymer host. The second polymer host may include, for example, poly(ethylene oxide) (PEO), poly(vinylidene fluoride-co-hexafluoropropylene) (PVdF-HFP), poly(methyl methacrylate) (PMMA), carboxymethyl cellulose (CMC), polyacrylonitrile (PAN), polyvinylidene difluoride (PVDF), poly(vinyl alcohol) (PVA), polyvinylpyrrolidone (PVP), lithium polyacrylate (LiPAA), and combinations thereof. In certain variations, the second gel precursor may include poly(vinylidene fluoride-co-hexafluoropropylene) (PVdF-HFP), by way of non-limiting example. For example, the second gel precursor may include about 2.5 wt. % of poly(vinylidene fluoride-co-hexafluoropropylene) (PVdF-HFP), by way of non-limiting example.

The second or cathode additive may include, for example, boron-containing compounds (such as, lithium bis(oxalato)borate (LiBOB), lithium difluoro(oxalato)borate (LiDFOB), tris(trimethylsilyl)borate (TMSB), and the like), silicon-containing compounds (such as, tris(trimethylsilyl)phosphate (TMSP), tris(trimethylsilyl)borate (TMSB), and the like), phosphorus-containing compounds (such as, triphenyl phosphine (TPP), ethyl diphenylphosphinite (EDP), triethyl phosphite (TEP), and the like), compounds containing phenyl, thiophene aniline, and/or maleimide groups (such as, biphenyl (BP), o-terphenyl (OT), 2,2'-bis[4-(4 maleimidophenoxy)phenyl]propane (BMP), and the like), compounds containing aniline, anisole, adamantyl, furan, and/or thiophene groups (such as, N,N-dimethyl-aniline (DMA)), and combinations thereof. For example, the second gel precursor may include about 2.5 wt. % of lithium difluoro(oxalato)borate (LiDFOB), by way of non-limiting example The second liquid electrolyte may be the same as or different from the first liquid electrolyte. For example, the second lithium salt may include, for example, lithium hexafluoroarsenate ($LiAsF_6$), lithium hexafluorophosphate ($LiPF_6$), lithium bis(fluorosulfonyl)imide (LiFSI), lithium perchlorate ($LiClO_4$), lithium tetrafluoroborate ($LiBF_4$), lithium-cyclo-difluoromethane-1,1-bis(sulfonyl)imide (LiDMSI), lithium bis(trifluoromethanesulfonyl)imide (LiTFSI), lithium bis(pentafluoroethanesulfonyl)imide (LiBETI), lithium bis(oxalato)borate (LiBOB), lithium difluoro(oxalato)borate (LiDFOB), lithium bis(monofluoromalonato)borate (LiBFMB), lithium difluorophosphate ($LiPO_2F_2$), lithium fluoride (LiF), and combinations thereof. In certain variations, the second precursor liquid may include 0.4 M of lithium bis(trifluoromethanesulfonyl)imide (LiTFSI) and 0.4 M lithium tetrafluoroborate ($LiBF_4$), by way of non-limiting example.

In certain aspects, the second electrolyte solvent dissolves the second lithium salt to enable good lithium ion conductivity, while exhibiting a low vapor pressure (e.g., less than about 10 mmHg at 25° C.) to match the fabrication process. The second electrolyte solvent may include, for example, carbonate solvents (such as, ethylene carbonate (EC), propylene carbonate (PC), glycerol carbonate, vinylene carbonate, fluoroethylene carbonate, 1,2-butylene carbonate, and the like), lactones (such as, γ-butyrolactone, δ-valerolactone, and the like), nitriles (such as, succinonitrile, glutaronitrile, adiponitrile, and the like), sulfones (such as, tetramethylene sulfone, ethyl methyl sulfone, vinyl sulfone, phenyl sulfone, 4-fluorophenyl sulfone, benzyl sulfone, and the like), ethers (such as, triethylene glycol dimethylether (triglyme, G3), tetraethylene glycol dimethylether (tetraglyme, G4), 1,3-dimethyoxy propane, 1,4-dioxane, and the like), phosphates (such as, triethyl phosphate, trimethyl phosphate, and the like), ionic liquids including ionic liquid cations (such as, 1-ethyl-3-methylimidazolium ([Emim]$^+$), 1-propyl-1-methylpiperidinium ([$PP_{13}$]$^+$), 1-butyl-1-methylpiperidinium ([$PP_{14}$]$^+$), 1-methyl-1-ethylpyrrolidinium ([$Pyr_{12}$]$^+$), 1-propyl-1-methylpyrrolidinium ([$Pyr_{13}$]$^+$), 1-butyl-1-methylpyrrolidinium ([$Pyr_{14}$]$^+$), and the like) and ionic liquid anions (such as, bis(trifluoromethanesulfonyl)imide (TFSI), bis(fluorosulfonyl imide (FS), and the like), and combinations thereof. In certain variations, the second precursor liquid may include 1:1 (v/v) of ethylene carbonate (EC) and gamabutyrolactone (GBL), by way of non-limiting example.

The second dilute solvent may be the same as or different form the first dilute solvent. The second dilute solvent may include, for example, dimethyl carbonate (DMC), ethyl acetate, acetonitrile, acetone, toluene, diethyl carbonate, 1,2,2-tetrafluoroethyl, 2,2,3,3-tetrafluoropropyl ether, and combinations thereof. For example, the second gel precursor may include dimethyl carbonate (DMC), by way of non-limiting example.

Although not illustrated, in certain variations, the method 400 may include preparing the second precursor liquid. The second precursor liquid may be prepared by adding the second gel precursor to the second liquid electrolyte. For example, in certain variations, about 2.5 wt. % of poly(vinylidene fluoride-co-hexafluoropropylene) (PVdF-HFP) and about 2.5 wt. % lithium difluoro(oxalato)borate (LiDFOB) may be added to the second liquid electrolyte to form the second precursor liquid, by way of non-limiting example. Similarly, in certain variations, the method 400 may include preparing the second precursor electrode. The second precursor electrode may be prepared by disposing the second plurality of solid-state electroactive material particles and an optional second plurality of solid-state electrolyte particles on or adjacent to one or more surfaces of the first bipolar current collector.

With renewed reference to FIG. 4, as illustrated, preparing 420 the second gel-assisted electrode may further include removing 424 the second dilute solvent (e.g., dimethyl carbonate (DMC)) to form a second gel-assisted electrode that includes the second polymeric gel electrolyte. The second dilute solvent may be removed 424 by heating or evaporation of the low-boiling point solvent (e.g., dimethyl carbonate (DMC)).

The method 400 may include, concurrently or simultaneously, preparing 430 a gel-assisted electrolyte layer. In certain variations, preparing 430 the gel-assisted electrolyte layer may include contacting 432 a third precursor liquid and an optional third plurality of solid-state electrolyte particles. Contacting 432 the third precursor liquid and the third plurality of solid-state electrolyte particles may include, for example, milling the third precursor liquid and the third plurality of solid-state electrolyte particles.

The third precursor liquid may include a third gel precursor and a third liquid electrolyte. For example, the third gel precursor may include a polymer host. The third liquid electrolyte may include a third lithium salt and a third electrolyte solvent. The third precursor liquid may include greater than or equal to about 0.1 wt. % to less than or equal to about 50 wt. %, and in certain aspects, optionally greater than or equal to about 10 wt. % to less than or equal to about 50 wt. %, of the third polymer host; and greater than or equal to about 5 wt. % to less than or equal to about 90 wt. % of the third liquid electrolyte.

The third polymer host may include, for example, nitrile-based solid polymer electrolytes (such as, poly(acrylonitrile) (PAN) and the like), polyether (such as, poly(ethylene oxide) (PEO), poly(ethylene glycol) (PEG), and the like), polyester-based solid polymer (such as, polyethylene carbonate (PEC), poly(trimethylene carbonate) (PTMC), poly(propylene carbonate) (PPC), and the like), polyvinylidene difluoride (PVDF), poly(vinylidene fluoride-co-hexafluoropropylene (PVDF-HFP), and combinations thereof. In certain variations, the third gel precursor may include poly(acrylonitrile) (PAN), by way of non-limiting example. For example, the third gel precursor may include about 16.7 wt. % of poly(acrylonitrile) (PAN), by way of non-limiting example.

The third liquid electrolyte may be the same as or different form the first liquid electrolyte and/or the second liquid electrolyte. The third liquid electrolyte may have a concentration greater than 0 mol/L to less than or equal to about 3 mol/L. The third lithium salt may include, for example, lithium hexafluoroarsenate ($LiAsF_6$), lithium hexafluorophosphate ($LiPF_6$), lithium bis(fluorosulfonyl)imide (LiFSI), lithium perchlorate ($LiClO_4$), lithium tetrafluoroborate ($LiBF_4$), lithium-cyclo-difluoromethane-1,1-bis(sulfonyl)imide (LiDMSI), lithium bis(trifluoromethanesulfonyl) imide (LiTFSI), lithium bis(pentafluoroethanesulfonyl) imide (LiBETI), lithium bis(oxalato)borate (LiBOB), lithium difluoro(oxalato)borate (LiDFOB), lithium bis (monofluoromalonato)borate (LiBFMB), lithium difluorophosphate ($LiPO_2F_2$), lithium fluoride (LiF), and combinations thereof. In certain variations, the third precursor liquid may include 0.4 M of lithium bis(trifluoromethanesulfonyl) imide (LiTFSI) and 0.4 M lithium tetrafluoroborate ($LiBF_4$), by way of non-limiting example.

The third electrolyte solvent should dissolve the third lithium salt to enable good lithium ion conductivity, while exhibiting a low vapor pressure (e.g., less than about 10 mmHg at 25° C.) to match the fabrication process. The third solvent may include, for example, carbonate solvents (such as, ethylene carbonate (EC), propylene carbonate (PC), glycerol carbonate, vinylene carbonate, fluoroethylene carbonate, 1,2-butylene carbonate, and the like), lactones (such as, γ-butyrolactone, δ-valerolactone, and the like), nitriles (such as, succinonitrile, glutaronitrile, adiponitrile, and the like), sulfones (such as, tetramethylene sulfone, ethyl methyl sulfone, vinyl sulfone, phenyl sulfone, 4-fluorophenyl sulfone, benzyl sulfone, and the like), ethers (such as, triethylene glycol dimethylether (triglyme, G3), tetraethylene glycol dimethylether (tetraglyme, G4), 1,3-dimethyoxy propane, 1,4-dioxane, and the like), phosphates (such as, triethyl phosphate, trimethyl phosphate, and the like), ionic liquids including ionic liquid cations (such as, 1-ethyl-3-methylimidazolium ($[Emim]^+$), 1-propyl-1-methylpiperidinium ($[PP_{13}]^+$), 1-butyl-1-methylpiperidinium ($[PP_{14}]^+$), 1-methyl-1-ethylpyrrolidinium ($[Pyr_{12}]^+$), 1-propyl-1-methylpyrrolidinium ($[Pyr_{13}]^+$), 1-butyl-1-methylpyrrolidinium ($[Pyr_{14}]^+$), and the like) and ionic liquid anions (such as, bis(trifluoromethanesulfonyl)imide (TFSI), bis(fluorosulfonyl imide (FS), and the like), and combinations thereof. In certain variations, the third precursor liquid may include 1:1 (v/v) of ethylene carbonate (EC) and gamabutyrolactone (GBL), by way of non-limiting example.

Although not illustrated, in certain variations, the method 400 may include preparing the third precursor liquid. The third precursor liquid may be prepared by adding the third gel precursor to the third liquid electrolyte. For example, in certain variations, about 16.7 wt. % of poly(acrylonitrile) (PAN), may be added to the third liquid electrolyte to form the third precursor liquid, by way of non-limiting example.

With renewed reference to FIG. 4, as illustrated, preparing 430 the gel-assisted electrolyte layer may further include casting the gel precursor solution to form the gel-assisted electrolyte layer. For example, preparing 430 the gel-assisted electrolyte layer may include hot-casting the third precursor liquid and allowing the hot-casted third precursor liquid to cool to form the gel-assisted electrolyte layer that includes a third polymeric gel electrolyte.

The method 400 further includes assembling 440 the battery. Assembling 440 the battery may include substantially aligning and/or stacking one or more of the first gel-assisted electrode, one or more of the second gel-assisted electrodes, and one or more of the gel-assisted electrolyte layers to form one or more cell units that define the battery.

Certain features of the current technology are further illustrated in the following non-limiting examples.

Example 1

An example battery cell may be prepared in accordance with various aspects of the present disclosure. The example battery cell may include a tri-gel electrolyte system. For example, the example battery cell may include a first or negative electrode including a plurality of negative solid-state electroactive material particles, and optionally, a first plurality of solid-state electrolyte particles, disposed on or adjacent to a first surface of a first bipolar current collector. The example battery cell may further include a second or positive electrode parallel with the negative electrode. The positive electrode may include a plurality of positive solid-state electroactive material particles, and optionally, a second plurality of solid-state electrolyte particles, disposed on or adjacent to a first surface of a second bipolar current collector. The example battery cell my further include a solid-electrolyte layer disposed between and physically separating the negative electrode and the positive electrode. More specifically, the solid-electrolyte layer may separate the plurality of negative solid-state electroactive material particles (and the optional first plurality of solid-state electrolyte particles) and the plurality of positive solid-state electroactive material particles (and the optional second plurality of solid-state electrolyte particles). The negative electrode may include a first polymeric gel electrolyte; the positive electrode may include a second polymeric gel electrolyte; and the solid-electrolyte layer may include, or may be defined by, a third polymeric gel electrolyte, in accordance with various aspects of the present disclosure.

Figure 5A:
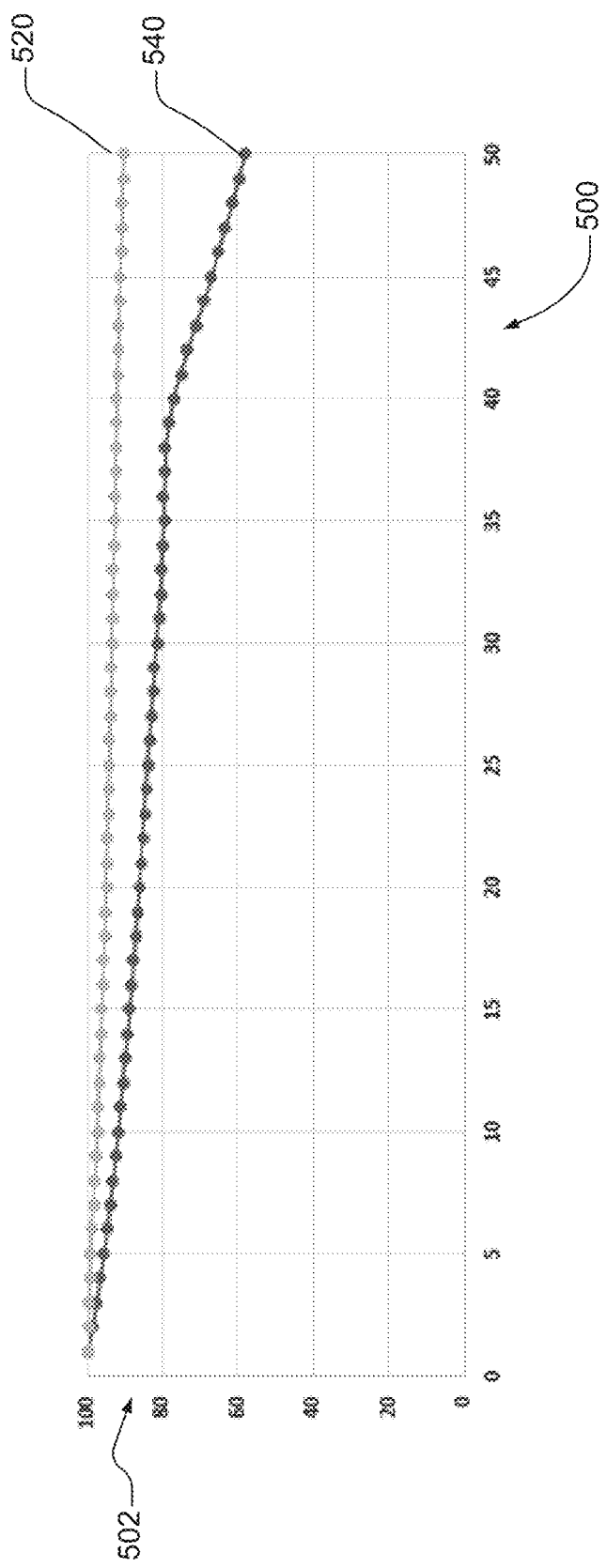
FIG. 5A is a graphical illustration demonstrating cycle performance of an example battery cell prepared in accordance with various aspects of the present disclosure.

FIG. 5A is a graphical illustration demonstrating the cycle performance of the example battery cell 520 including the tri-gel electrolyte system in accordance with various aspects of the present disclosure and a comparable battery cell 540 having the same configuration but including a single gel electrolyte. The x-axis 500 represents cycle number. The y-axis 502 represents capacity retention (%). As illustrated, the example battery cell 520 has improved long-term performance.

Figure 5B:
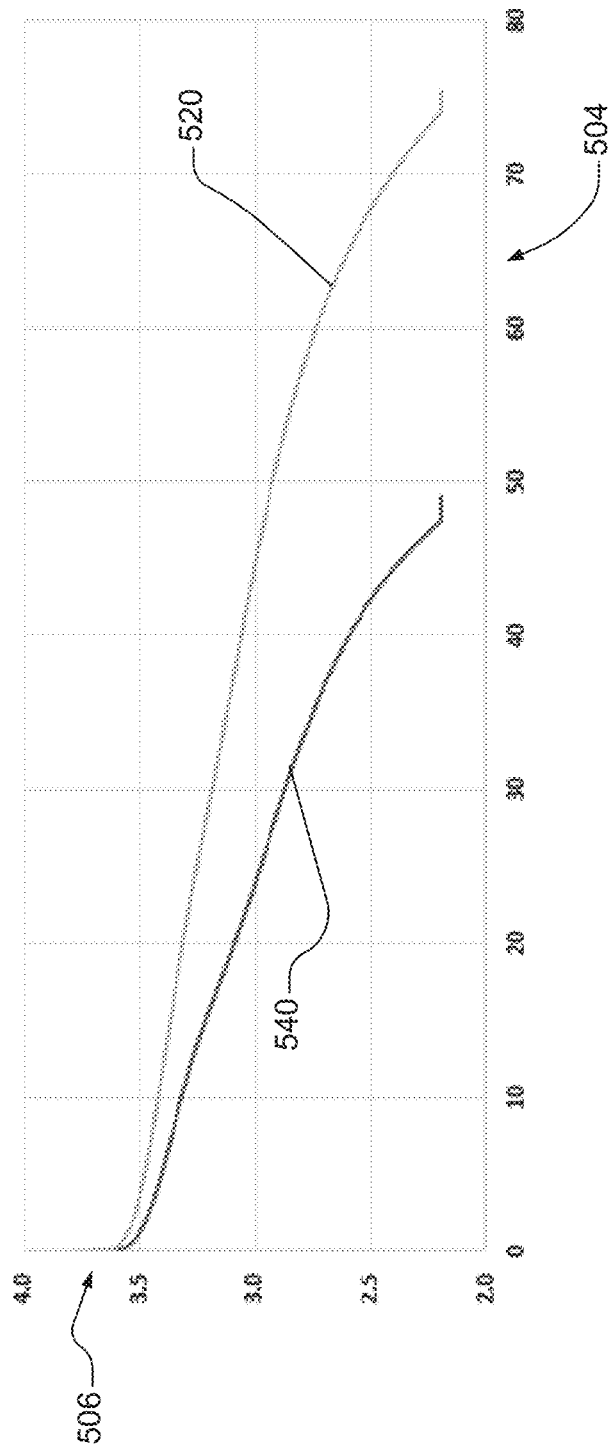
FIG. 5B is a graphical illustration demonstrating discharge of an example battery cell prepared in accordance with various aspects of the present disclosure.

FIG. 5B is a graphical illustration demonstrating cell discharge of the example battery cell 520 including the tri-gel electrolyte system in accordance with various aspects of the present disclosure and the comparable battery cell 540 having the same configuration but including a single gel electrolyte. The x-axis 504 represents capacity retention (%). The y-axis 506 represents voltage (V). As illustrated, the example battery cell 520 has improved long-term performance.

Figure 5C:
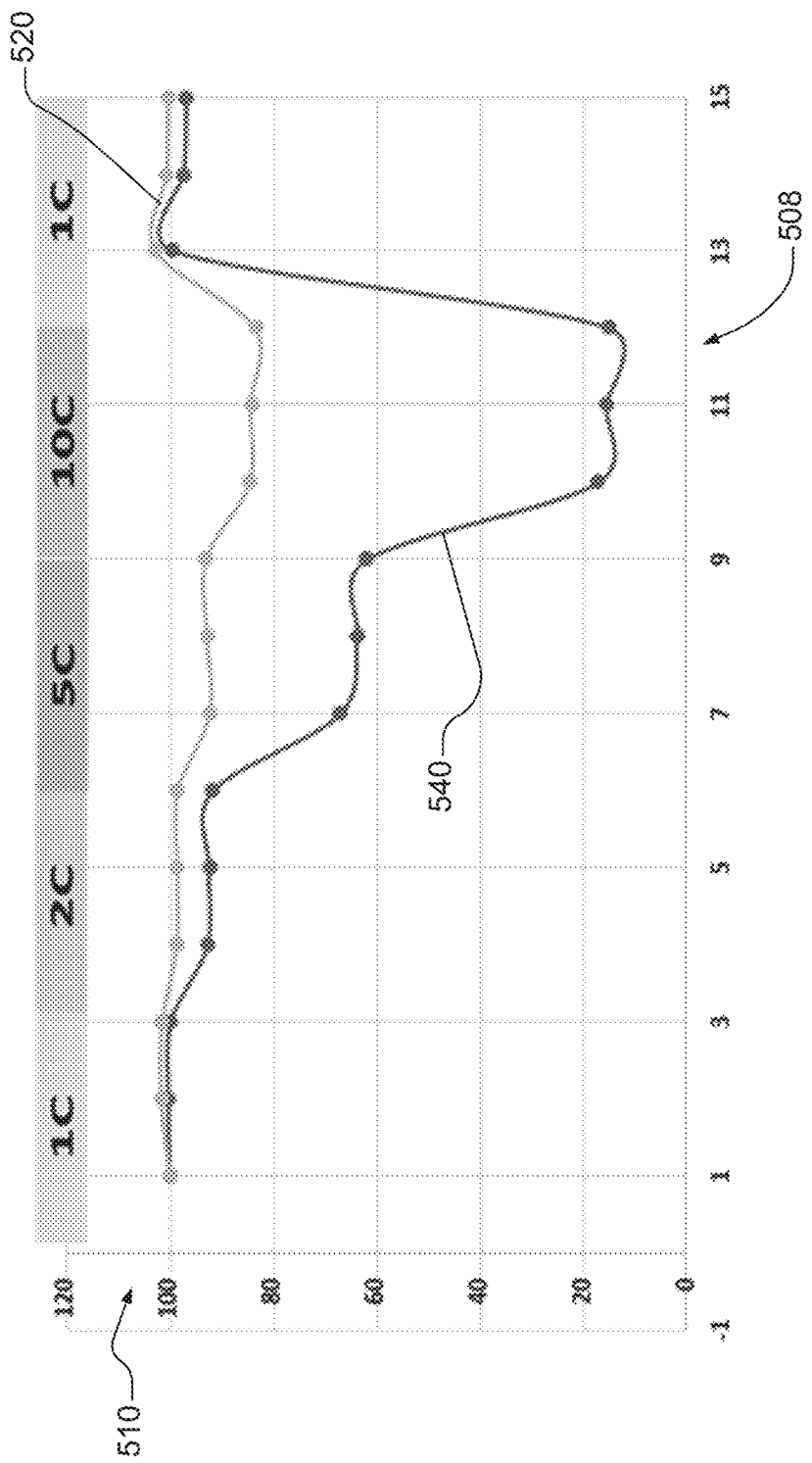
FIG. 5C is a graphical illustration demonstrating rate tests for an example battery cell prepared in accordance with various aspects of the present disclosure.

FIG. 5C is a graphical illustration demonstration a rate test at 25° C. of the example battery cell 520 including the tri-gel electrolyte system in accordance with various aspects of the present disclosure and the comparable battery cell 540 having the same configuration but including a single gel electrolyte. The x-axis 508 represents cycle number. The y-axis 510 represents capacity retention (%). As illustrated, the example battery cell 520 has improved long-term performance.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrochemical cell that cycles lithium ions, the electrochemical cell comprising:
a first electrode comprising a first plurality of solid-state electroactive material particles and a first polymeric gel electrolyte, the first polymeric gel electrolyte comprising greater than 0 wt. % to less than or equal to about 10 wt. % of a first additive comprising a compound having an unsaturated carbon bond, a sulfur-containing compound, a halogen-containing compound, a methyl substituted glycolide derivative, a maleimide (MI), a compound containing an electron withdrawing group, and combinations thereof;
a second electrode comprising a second plurality of solid-state electroactive material particles and a second polymeric gel electrolyte that is different from the first polymeric gel electrolyte, the second polymeric gel electrolyte comprising greater than 0 wt. % to less than or equal to about 10 wt. % of a second additive that is different from the first additive; and
an electrolyte layer disposed between the first electrode and the second electrode, the electrolyte layer comprising a third polymeric gel electrolyte that is different from both the first polymeric gel electrolyte and the second polymeric gel electrolyte.

2. The electrochemical cell of claim 1, wherein the unsaturated carbon bond containing compound comprises vinylene carbonate (VC), vinyl ethylene carbonate (VEC), and combinations thereof;
the sulfur-containing compound comprises ethylene sulfite(ES), propylene sulfite (PyS), and combinations thereof; and
the halogen-containing compound comprises fluoroethylene carbonate (FEC), chloro-ethylene carbonate (Cl-EC), and combinations thereof.

3. The electrochemical cell of claim 1, wherein the second additive comprises a boron-containing compound, a silicon-containing compound, a phosphorus-containing compound, a compound containing at least one of a phenyl group, a thiophene aniline group, a maleimide group, an aniline group, an anisole group, an adamantyl group, a furan group, and a thiophene group, and combinations thereof.

4. The electrochemical cell of claim 3, wherein the boron-containing compound comprises lithium bis(oxalato) borate (LiBOB), lithium difluoro (oxalato) borate (LiDFOB), tris(trimethylsilyl) borate (TMSB), and combinations thereof;
the silicon-containing compound comprises tris(trimethylsilyl)phosphate (TMSP), tris(trimethylsilyl) borate (TMSB), and combinations thereof;
the phosphorus-containing compound comprises triphenyl phosphine (TPP), ethyl diphenylphosphinite (EDP), triethyl phosphite (TEP), and combinations thereof; and
the compound containing at least one of a phenyl group, a thiophene aniline group, a maleimide group, an aniline group, an anisole group, an adamantyl group, a furan group, and a thiophene group comprises biphenyl (BP), o-terphenyl (OT), 2,2'-bis[4-(4 maleimidophenoxy)phenyl]propane (BMP), N,N-dimethyl-aniline (DMA), and combinations thereof.

5. The electrochemical cell of claim 1, wherein the first polymeric gel electrolyte and the second polymeric gel electrolyte each further comprises greater than or equal to about 0.1 wt. % to less than or equal to about 50 wt. % of a polymer host.

6. The electrochemical cell of claim 5, wherein the first polymeric gel electrolyte and the second polymeric gel electrolyte each comprise a polymer host independently selected from the group consisting of: poly(ethylene oxide) (PEO), poly(vinylidene fluoride-co-hexafluoropropylene) (PVdF-HFP), poly(methyl methacrylate) (PMMA), carboxymethyl cellulose (CMC), polyacrylonitrile (PAN), polyvinylidene difluoride (PVDF), poly(vinyl alcohol) (PVA), polyvinylpyrrolidone (PVP), lithium polyacrylate (LiPAA), and combinations thereof.

7. The electrochemical cell of claim 1, wherein the first polymeric gel electrolyte and the second polymeric gel electrolyte each further comprises greater than or equal to about 5 wt. % to less than or equal to about 90 wt. % of a liquid electrolyte.

8. The electrochemical cell of claim 1, wherein the third polymeric gel electrolyte comprises greater than or equal to about 0.1 wt. % to less than or equal to about 50 wt. % of a polymer host, and greater than or equal to about 5 wt. % to less than or equal to about 90 wt. % of a liquid electrolyte.

9. The electrochemical cell of claim 8, wherein the polymer host is selected from the group consisting of: poly(acrylonitrile) (PAN), poly(ethylene oxide) (PEO), poly (ethylene glycol) (PEG), polyethylene carbonate (PEC), poly(trimethylene carbonate) (PTMC), poly(propylene carbonate) (PPC), polyvinylidene difluoride (PVDF), poly(vinylidene fluoride-co-hexafluoropropylene) (PVDF-HFP), and combinations thereof.

10. The electrochemical cell of claim 8, wherein the electrolyte layer is a free-standing membrane defined by the third polymeric gel electrolyte, wherein the free-standing membrane has a thickness greater than or equal to about 5 micrometers to less than or equal to about 1,000 micrometers.

11. The electrochemical cell of claim 8, wherein the electrolyte layer further comprises greater than 0 wt. % to less than or equal to about 80 wt. % of a plurality of solid-state electrolyte particles.

12. The electrochemical cell of claim 1, wherein the electrochemical cell further comprises:
a first bipolar current collector disposed on or adjacent to an exposed surface of the first electrode and parallel with the electrolyte layer;
a second bipolar current collector disposed on or adjacent to an exposed surface of the second electrode and parallel with the electrolyte layer; and
one or more polymer blockers coupled to and extending between the first bipolar current collector and the second bipolar current collector.

13. An electrochemical cell that cycles lithium ions, the electrochemical cell comprising:
a first electrode comprising a first plurality of solid-state electroactive material particles and a first polymeric gel electrolyte comprising greater than 0 wt. % to less than or equal to about 10 wt. % of a first additive, greater than or equal to about 0.1 wt. % to less than or equal to about 15 wt. % of a first polymer host, and greater than or equal to about 5 wt. % to less than or equal to about 90 wt. % of a first liquid electrolyte;
a second electrode comprising a second plurality of solid-state electroactive material particles and a second polymeric gel electrolyte comprising greater than 0 wt. % to less than or equal to about 10 wt. % of a second additive that is different from the first additive and is selected from the group consisting of: lithium bis (oxalato) borate (LiBOB), lithium difluoro (oxalato) borate (LiDFOB), tris(trimethylsilyl) borate (TMSB), tris(trimethylsilyl)phosphate (TMSP), triphenyl phosphine (TPP), ethyl diphenylphosphinite (EDP), triethyl phosphite (TEP), biphenyl (BP), o-terphenyl (OT), 2,2'-bis[4-(4 maleimidophenoxy)phenyl]propane (BMP), N,N-dimethyl-aniline (DMA), and combinations thereof, greater than or equal to about 0.1 wt. % to less than or equal to about 15 wt. % of a second polymer host, and greater than or equal to about 5 wt. % to less than or equal to about 90 wt. % of a second liquid electrolyte; and
an electrolyte layer disposed between the first electrode and the second electrode, the electrolyte layer comprising a third polymeric gel electrolyte comprising greater than or equal to about 10 wt. % to less than or equal to about 50 wt. % of a third polymer host and greater than or equal to about 5 wt. % to less than or equal to about 90 wt. % of a third liquid electrolyte.

14. The electrochemical cell of claim 13, wherein the first liquid electrolyte, the second liquid electrolyte, and the third liquid electrolyte are different.

15. The electrochemical cell of claim 13, wherein the first polymer host and the second polymer host are independently selected from the group consisting of: poly(ethylene oxide) (PEO), poly(vinylidene fluoride-co-hexafluoropropylene) (PVdF-HFP), poly(methyl methacrylate) (PMMA), carboxymethyl cellulose (CMC), polyacrylonitrile (PAN), polyvinylidene difluoride (PVDF), poly(vinyl alcohol) (PVA), polyvinylpyrrolidone (PVP), lithium polyacrylate (LiPAA), and combinations thereof; and
the third polymer host is selected from the group consisting of: poly(acrylonitrile) (PAN), poly(ethylene oxide) (PEO), poly(ethylene glycol) (PEG), polyethylene carbonate (PEC), poly(trimethylene carbonate) (PTMC), poly(propylene carbonate) (PPC), polyvinylidene difluoride (PVDF), poly(vinylidene fluoride-co-hexafluoropropylene) (PVDF-HFP), and combinations thereof.

16. The electrochemical cell of claim 13, wherein the first additive is selected from the group consisting of: vinylene carbonate (VC), vinyl ethylene carbonate (VEC), ethylene sulfite(ES), propylene sulfite (PyS), fluoroethylene carbonate (FEC), chloro-ethylene carbonate (Cl-EC), and combinations thereof.

17. A method for forming an electrochemical cell that cycles lithium ions, the method comprising:
preparing a first gel-assisted electrode, wherein preparing the first gel-assisted electrode comprises contacting a first precursor electrode and a first precursor liquid comprising a first solvent and a first additive comprising a compound having an unsaturated carbon bond, a sulfur-containing compound, a halogen-containing compound, a methyl substituted glycolide derivative, a maleimide (MI), a compound containing an electron withdrawing group, and combinations thereof and removing the first solvent to form the first gel-assisted electrode;
preparing a second gel-assisted electrode, wherein preparing the second gel-assisted electrode comprises contacting a second precursor electrode and a second precursor liquid comprising a second solvent and a second additive that is different from the first additive, and removing the second solvent to form the second gel-assisted electrode;
preparing an electrolyte layer comprising a third precursor liquid, wherein the first precursor liquid is different from the second and third precursor liquids and the second precursor liquid is different from the first and third precursor liquids; and
stacking the first gel-assisted electrode, the second gel-assisted electrode, and the electrolyte layer to form the electrochemical cell, wherein the electrolyte layer is disposed between the first gel-assisted electrode and the second gel-assisted electrode.

18. The method of claim 17, wherein
the second additive is selected from the group consisting of: lithium bis(oxalato) borate (LiBOB), lithium difluoro (oxalato) borate (LiDFOB), tris(trimethylsilyl) borate (TMSB), tris(trimethylsilyl)phosphate (TMSP), triphenyl phosphine (TPP), ethyl diphenylphosphinite (EDP), triethyl phosphite (TEP), biphenyl (BP), o-terphenyl (OT), 2,2'-bis[4-(4 maleimidophenoxy)phenyl] propane (BMP), N,N-dimethyl-aniline (DMA), and combinations thereof.

19. The method of claim 17, wherein the unsaturated carbon bond containing compound comprises vinylene carbonate (VC), vinyl ethylene carbonate (VEC), and combinations thereof;
the sulfur-containing compound comprises ethylene sulfite(ES), propylene sulfite (PyS), and combinations thereof; and the halogen-containing compound comprises fluoroethylene carbonate (FEC), chloro-ethylene carbonate (Cl-EC), and combinations thereof.

* * * * *